United States Patent [19]

Deno et al.

[11] Patent Number: 5,935,703
[45] Date of Patent: Aug. 10, 1999

[54] MAGNETIC RECORDING MEDIUM AND BINDER FOR USE WITH MAGNETIC COATING IN THE MAGNETIC RECORDING MEDIUM

[75] Inventors: Takayuki Deno; Tsutomu Yashiro; Ikuo Matsumoto, all of Mito; Osamu Kobayashi, Ibaraki-ken; Noboru Watanabe, Mito; Masaru Hanayama, Ibaraki-ken; Takumu Tada, Yokohama; Toshimitsu Saitou, Mito, all of Japan

[73] Assignee: Victor Company of Japan, Ltd., Yokohama, Japan

[21] Appl. No.: 08/949,964

[22] Filed: Oct. 14, 1997

Related U.S. Application Data

[63] Continuation of application No. 08/568,674, Dec. 7, 1995, abandoned.

[30] Foreign Application Priority Data

| Dec. 9, 1994 | [JP] | Japan | 331760 |
| Dec. 28, 1994 | [JP] | Japan | 339715 |
| Feb. 17, 1995 | [JP] | Japan | 053175 |
| Feb. 28, 1995 | [JP] | Japan | 066847 |
| Sep. 12, 1995 | [JP] | Japan | 259384 |

[51] Int. Cl.$^6$ ...................................... B32B 5/16
[52] U.S. Cl. ................ 428/336; 428/425.9; 428/480; 428/522; 428/694 B; 428/694 BU; 428/694 BG; 428/694 BA; 428/900
[58] Field of Search ............... 525/454; 528/229; 428/336, 425.9, 480, 522, 694 B, 694 BU, 694 BG, 694 BA, 900

[56] References Cited

U.S. PATENT DOCUMENTS 4,956,220 9/1990 Sueyoshi et al. .................. 428/141
5,475,066 12/1995 Nikles et al. ...................... 525/453
5,527,603 6/1996 Isobe et al. ....................... 428/323
5,534,361 7/1996 Hisano et al. .................. 428/694 RE

FOREIGN PATENT DOCUMENTS 093 194 11/1983 European Pat. Off. .
6-44551 2/1994 Japan .

OTHER PUBLICATIONS

IEEE Transactions on Magnetics, 29 (6), 3649–3651 (1993) Liang, Jeng–Li et al.

Progress in Organic Coatings, No. 15, 63–71 (1987) Kaleem, K. et al.

J. Appl. Poly. Sci. 42, 2893–2897 (1991) Nithianandam, V.S. et al.

Patent Abstracts of Japan 10(151), (M–483) May 31, 1986.

Primary Examiner—Stevan A. Resan
Attorney, Agent, or Firm—Michael N. Meller

[57] ABSTRACT

A magnetic recording medium has a substrate and a magnetic layer formed on the substrate. The magnetic layer includes magnetic powder and a binder for binding the magnetic powder on the substrate. The binder includes at least a resin component containing at least an aminoquinone structure selected from an aminoquinone structure group shown with formulas (1-1a), (1-1b), (1-3a) and (1-3b) as a constitutional unit and at least a polar group selected from a group shown with a formula (1-2) in a composition of the resin component. Thus, the magnetic recording medium has excellent corrosion resistance of the magnetic powder and excellent conservation and running durability.

2 Claims, No Drawings

MAGNETIC RECORDING MEDIUM AND BINDER FOR USE WITH MAGNETIC COATING IN THE MAGNETIC RECORDING MEDIUM

This application is a continuation, of application Ser. No. 08/568674, filed Dec. 7, 1995 now abandoned.

BACKGROUND OF THE INVENTION

1. Field of the Invention

This invention relates to improvements of coating type magnetic recording mediums having magnetic layers which have excellent corrosion resistance, and to binders for use with the magnetic recording mediums. This invention, particularly, relates to the magnetic recording mediums capable of high density recording without degradation of mechanical strength and durability, and the binders having excellent dispersibility of the magnetic particles.

2. Description of the Related Arts

In the prior art, as a binder for binding magnetic particles on a supporting base of the magnetic recording medium, there have been used binders combined with various kinds of resin. However, these binders have less corrosion resistance for protecting the magnetic particles such as metal magnetic particles or a metal magnetic powder from oxidation, which is used for high density recording. Thus, an attempt has been done to enhance the corrosion resistance of the magnetic medium by employing surface treatment of the metal magnetic particles. But this has not brought an adequate result.

Recently, for eliminating the above problem, there are being developed binders capable of improving corrosion resistance of the metal magnetic powder by introducing aminoquinone compounds to a resin component of the binder.

The binders introduced with the aminoquinone compounds (referred to as aminoquinone binder) have excellent corrosion resistance, however, they can not produce its inherent advantage adequately because the dispersibility of the magnetic powder is degraded in the binders, in particular, when the magnetic powder is made of small sized particles.

Further, the study of improvement of the magnetic recording characteristic is being made in the recent magnetic recording mediums so as to realize the high recording density. Specifically, the study of surface smoothness of the magnetic recording medium is forwarded to prevent the degradation of reproducing output level developed due to a spacing loss between a magnetic gap of a magnetic head and the magnetic recording medium as the study of providing a saturation magnetic flux density Bm and the coercive force Hc of the magnetic recording medium are forwarded. However, the present situation is that it is very difficult to obtain an adequate surface smoothness from the magnetic recording medium employing the aminoquinone binder.

Furthermore, when such aminoquinone binders are used, the mechanical strength of the magnetic recording layer is largely degraded, so that the mechanical strength of the magnetic recording medium itself is also degraded largely.

As mentioned above, though the aminoquinone binders in the prior art are excellent to prevent metals from being corroded, but they does not satisfy the dispersibility of the magnetic powder, the surface smoothness and mechanical strength of the magnetic layer.

In the coating type magnetic recording medium, the magnetic layer is formed by coating a magnetic paint containing a mixture of the binder and the magnetic powder on a supporting base.

In the prior art, in order to improve the electro-magnetic conversion characteristic, an attempt was made to improve the S/N (a ratio of a signal output level to a noise level mainly caused by a particle noise) by employing the magnetic powder having a small particle size. Actually, good results have been obtained from that because the particle noise depends on the diameters of the magnetic particles. However, as mentioned in the foregoing, the smaller the diameters of the magnetic particles become, the more difficult the dispersion of the magnetic particles into the binder (binding resin) becomes. Thus, it was impossible to obtain a desired electromagnetic conversion characteristic as long as employing the conventional binders which have been widely used.

An attempt has been made to resolve the drawback, i.e., the difficulty of the dispersion of the magnetic particles, by introducing a functional group having a high polarity into a resin component of the binder.

Upon the industrial production of the magnetic recording mediums, it is a very important subject to coat the magnetic paint on the supporting base maintaining a stable condition of the magnetic powder well dispersed in the binder. But, the smaller the diameters of the magnetic particles, the more the dispersibility of the magnetic particles is degraded, thus in the prior art, it was unable to obtain the magnetic paint capable of maintaining the stable condition of the magnetic powder well dispersed for a long time. In particular, when a crosslinking agent was added to the magnetic paint to secure durability of the magnetic layer, the cohesion of the magnetic particles was accelerated, resulting in increasing a paint viscosity, thus, degrading the dispersibility thereof. Particularly, the sizes of the magnetic particles of less than 0.1 μm caused serious problems, which posed obstacles to the industrial production of the magnetic recording mediums. Further, when the particle sizes of the magnetic powder are minimized, the dispersion stability of the magnetic powder tends to be deteriorated corresponding to a specific surface area of the magnetic powder. Particularly, in the case of adding the crosslinking agent into the magnetic paint to secure the durability of the magnetic layer, the cohesion of the magnetic particles is enhanced, resulting in increasing the paint viscosity, as mentioned in the foregoing. The specific surface area of not less than 45 m$^2$/g in the magnetic powder causes serious problems, though the larger specific surface area of the magnetic powder is advantageous to the electro-magnetic conversion characteristic of the magnetic recording medium.

Recently, according to the demand of a high density recording, there has been used the metal magnetic powder (metal ferromagnetic powder). Further, for a practical use of a short wavelength recording of not more than 0.5 μm, the metal magnetic powder, each of magnetic particles having a long axis of not more than 0.1 μm and a saturation magnetization ($\sigma_s$) of not less than 130 emu/g requires to be utilized for recording.

Further, instead of the conventional analogue magnetic recording, the digital magnetic recording comes to the main current of the magnetic recording. Thus, the thickness of the magnetic layer needs to be about not more than 0.2 μm because excellent over-write characteristic is required.

Further, there is a problem of durability of the magnetic recording medium, in particular, of a magnetic tape when the magnetic layer is required to be made much thinner so as to increase the volume recording density and the playing time of the magnetic tape in the digital recording.

As well known, the stiffness of the magnetic tape is proportional to the third power of thickness of the magnetic tape. Thus, thinning the magnetic tape signifies the substantial degradation of the tape stiffness. In order to increase or maintain the stiffness of the magnetic tape, it is necessary to enhance the mechanical strengths (Young's modulusli) of the constitutional components such as a magnetic layer, a base film and a non-magnetic layer (for instance, a back coat layer). However, it is difficult to enhance the strength of the base film because the mechanical strength thereof is limited by the material and the production method of the base film. Thus, it is advantageous to enhance the strengths of the magnetic layer and the non-magnetic layer.

The degradation of the mechanical strength of the magnetic layer decreases running durability of the magnetic tape, particularly in a still motion picture mode on a video tape recorder where the magnetic heads repeatedly run on the same tracks on the magnetic tape.

Further, the degradation of the mechanical strength of the magnetic layer invites the degradation of conservation durability such as heatproof durability, resulting in decreasing the reproducing output level of the magnetic tape and increasing dropout thereof resulting from surface defects such as tape cramp marks and print-through of the back surface of the magnetic tape when they are stored under a condition of high temperature and high humidity.

SUMMARY OF THE INVENTION

Accordingly, a general object of the present invention is to provide magnetic recording mediums and the binder for use with the magnetic recording mediums in which the above disadvantages have been eliminated.

A more specific object of the present invention is to provide a magnetic recording medium comprising: a substrate; and a magnetic layer formed on the substrate, the magnetic layer comprising a magnetic powder and binding means for binding the magnetic powder on the substrate, the binding means including at least a resin component containing at least an aminoquinone structure selected from an aminoquinone structure group shown with formulas (1-1a), (1-1b), (1-3a) and (1-3b) as a constitutional unit and at least a polar group selected from a group shown with a formula (1-2) in a composition of the resin component.

Another and more specific object of the present invention is to provide a binder for use with a magnetic layer of a magnetic recording medium, the binder including a resin component containing at least an aminoquinone structure selected from an aminoquinone structure group shown with formulas (1-1a), (1-1b), (1-3a) and (1-3b) as a constitutional unit and at least a polar group selected from a group shown with a formula (1-2).

Another specific object of the present invention is provide a magnetic recording medium comprising: a substrate; and a magnetic layer formed on the substrate, the magnetic layer comprising metal ferromagnetic powder and binding means for binding the metal ferromagnetic powder on the substrate, the binding means including at least a resin component containing at least an aminoquinone structure selected from an aminoquinone structure group shown with formulas (2-1a) and (2-1b) as a constitutional unit in a composition of the resin component and the particles of the ferromagnetic powder having an average long axis length from 0.03 to 0.10 $\mu$m.

Another specific object of the present invention is provide a magnetic recording medium comprising: a substrate; and a magnetic layer formed on the substrate, the magnetic layer comprising metal ferromagnetic powder and binding means for binding the metal ferromagnetic powder on the substrate, the binding means including at least a resin component containing at least an aminoquinone structure selected from an aminoquinone structure group shown with formulas (2-1a) and (2-1b) as a constitutional unit in a composition of the resin component and the ferromagnetic powder having a specific surface area by BET from 45 to 80 $m^2/g$.

Another specific object of the present invention is provide a magnetic recording medium comprising: a substrate; and a magnetic layer formed on the substrate, the magnetic layer comprising metal ferromagnetic powder and binding means for binding the metal ferromagnetic powder on the substrate, the binding means including at least a resin component containing at least an aminoquinone structure selected from an aminoquinone structure group shown with formulas (3-1a) and (3-1b) as a constitutional unit in a composition of the resin component and a saturation magnetic flux density of the magnetic layer is made to be from 0.35 to 0.55 T and a thickness of the magnetic layer is made to be from 0.08 to 0.25 $\mu$m.

Another specific object of the present invention is provide a magnetic recording medium comprising: a substrate; and a magnetic layer formed on the substrate, the magnetic layer comprising metal ferromagnetic powder and binding means for binding the metal ferromagnetic powder on the substrate, the binding means including at least a resin component containing at least an aminoquinone structure selected from an aminoquinone structure group shown with formulas (3-1b) and (4-1b) as a constitutional unit in a composition of the resin component and a Young's modulus of the magnetic layer is made to be from 16 to 25 $GN/m^2$.

Another specific object of the present invention is provide a magnetic recording medium comprising: a substrate; and a magnetic layer formed on the substrate, the magnetic layer comprising metal ferromagnetic powder and binding means for binding the metal ferromagnetic powder on the substrate, the binding means including at least a resin component containing at least an aminoquinone structure selected from an aminoquinone structure group shown with formulas (3-1b) and (4-1b) as a constitutional unit in a composition of the resin component and a Young's modulus of the magnetic layer is made to be from 25 to 40 GN $m^2$.

Another specific object of the present invention is provide a magnetic recording medium comprising: a substrate; a magnetic layer formed on the substrate, the magnetic layer comprising metal ferromagnetic powder and binding means for binding the metal ferromagnetic powder on the substrate, magnetic particles of the metal ferromagnetic powder being coated with an aluminum compound, the binding means including at least a resin component containing at least an aminoquinone structure selected from an aminoquinone structure group shown with formulas (5-1a), (5-1b) as a constitutional unit.

Other objects and further features of the present invention will be apparent from the following detailed description.

DETAILED DESCRIPTION OF THE PREFERRED EMBODIMENTS

A description is now given of specific embodiments from a first embodiment to a fifth embodiment with respect to the magnetic recording medium, the binder and the magnetic paint for use with the magnetic recording medium of the present invention.

The magnetic recording medium of the present invention generally comprises a substrate such as a base film and a magnetic layer formed on the substrate. The magnetic layer includes a magnetic powder and a binder for binding the magnetic powder on the substrate.

[A First Embodiment]

One of the main features of a first embodiment in the present invention is that a binder for forming a magnetic layer includes at least a resin component which contains reaction products (aminoquinone compounds) of quinones and amine compounds, and specified polar groups, in the composition of the binder.

Specifically, the binder includes at least a resin component containing at least an aminoquinone structure selected from an aminoquinone structure groups shown with the formulas of (1-1a), (1-1b), (1-3a) and (1-3b) below as a constitutional unit and at least a polar group selected from a group shown with the formula of (1-2). Thus, the binder mentioned above improves the dispersibility of the magnetic powder and remarkably increases the corrosion resistance of the magnetic powder (in particular, magnetic metal powder), resulting in realization of the magnetic recording medium having excellent durability.

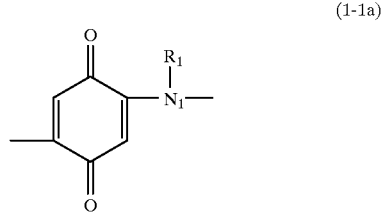

(1-1a)

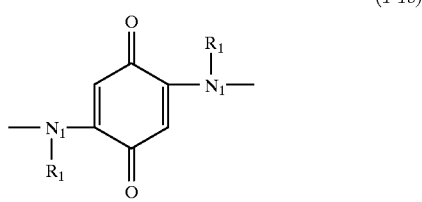

(1-1b)

wherein

N1=nitrogen having tertiary amine

R1=alkyl group, aralkyl group, phenyl group, $NO_2$, —F, —$OR^7$, —$NR^7_2$ ($R^7$=hydrogen atom, alkyl group, aralkyl group and phenyl group)

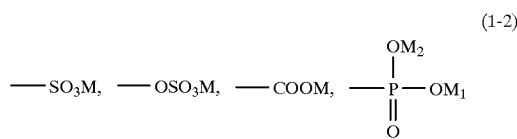

(1-2)

wherein

M=hydrogen atom, Li, Na and K $M_1$=hydrogen atom, Li, Na, K, and alkyl group $M_2$=hydrogen atom, Li, Na, K, and alkyl group

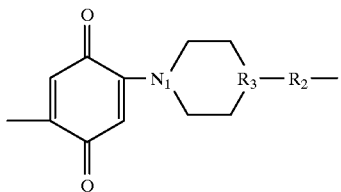

(1-3a)

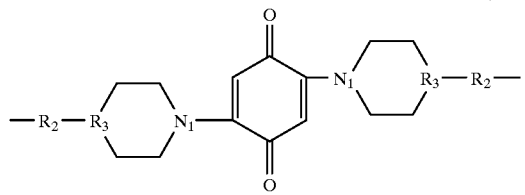

(1-3b)

wherein

N1=nitrogen of tertiary amine

R2=alkylene, phenylene group

R3=N, CH

Further, a weight ratio of the constitutional monomers having aminoquinone structures to the resin components containing the aminoquinone structures as a constitutional unit is preferably from 0.1 to 50 weight % to obtain not only an excellent corrosion resistance but also an excellent electro-magnetic conversion characteristic and an mechanical strength.

In a range of less than 0.1 weight %, the corrosion resistance is largely degraded. On the other hand, in a range of more than 50 weight %, the mechanical strength is degraded, in particular, inviting a decrement of a breaking elongation, and the dispersibility of the magnetic powder is also degraded, resulting a degradation of the corrosion resistance.

Further, a weight ratio of the resin component containing aminoquinone structure to the binder is preferably not less than 5 weight %. A range of less than 5 weight % invites the degradation of the corrosion resistance greatly.

As the resin components capable of introducing the aminoquinone structures therein, well-known resins widely used for the conventional magnetic recording medium are available, particularly, vinyl chloride resin, polyurethane resin and polyester resin are preferable.

When introducing the aminoquinone structure into vinyl chloride resin, it is possible to obtain a more excellent breaking elongation (mechanical strength) by causing the weight % of the monomers of the aminoquinone structure to be from 0.1 to 10 weight %.

When introducing the aminoquinone structures into polyurethane or polyester resin, it is possible to obtain a more effective corrosion resistance by causing the weight % of the monomers of the aminoquinone structures to be from 10 to 40 weight %.

Next, a detailed explanation is given of specific embodiments in the first embodiment of the present invention.

The aminoquinone structures shown with the formulas (1-1a), (1-1b), (1-3a) and (1-3b) are introduced resin components by using such aminoquinone monomers as shown with the formulas (1-4) and (1-5). It is noted that R1, R2, and R3 in the formulas (1-4) and (1-5) are the same as those shown in the formulas (1-1a), (1-1b) and (1-3a) and (1-3b).

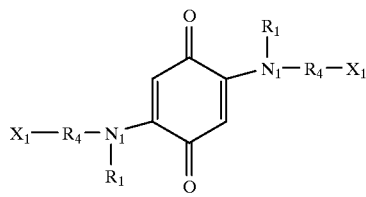
(1-4)

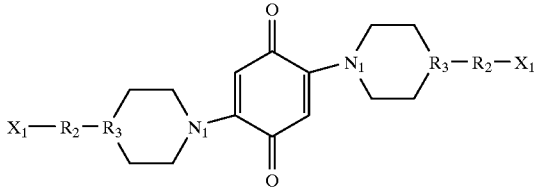
(1-5)

wherein

N1=nitrogen having tertiary amine

R1=alkyl group, aralkyl group, phenyl group, —NO$_2$, —F, —OR$^7$, —NR$^7_2$ (R$^7$=hydrogen, alkyl group, aralkyl group, and phenyl group)

R4=hydrocarbon group having a number of carbon from 2 to 150)

X$_1$=OH, carboxylic acid group, vinyl group, acryl group, epoxy group, thiol group, and isocyanate group wherein
N1=nitrogen having tertiary amine
R2=alkylene, phenylene group
R3=N, CH
X$_1$=OH, carboxylic acid group, vinyl group, epoxy group, thiol group, and isocyanate group In the formulas (1-4) and (1-5), N1 bonded to p-benzoquinone is preferably tertiary amine, otherwise, for instance, secondary amine would be result in degrading the corrosion resistance greatly.

As the specific examples of the aminoquinone monomers, there are those shown with the formulas of (1-6a to 1-6e) and (1-7a to 1-7e), however, the monomers used in the present invention are not limited to them as long as they satisfy the formulas of (1-4) and (1-5). Further, it is possible to employ amine substitution products of hydroquinones as the aminoquinone monomers, wherein the hydroquinones introduced into the resin component are oxidized into benzoquinone by using an oxidizing agent, resulting in obtaining aminoquinone structure in the binding resin.

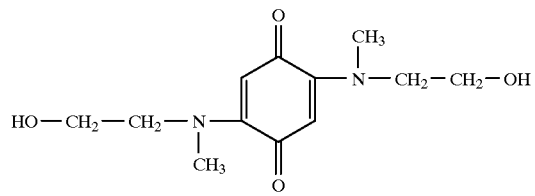
(1-6a)

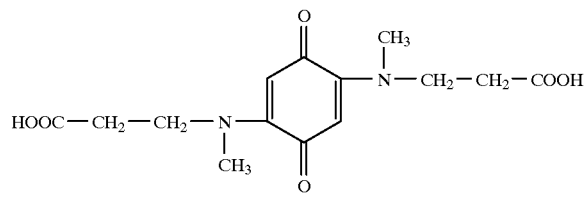
(1-6b)

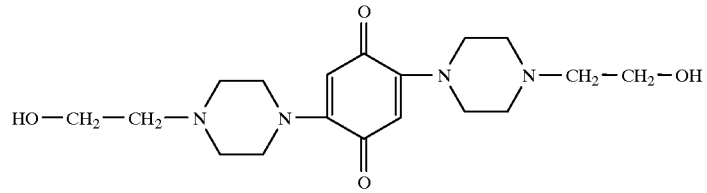
(1-6c)

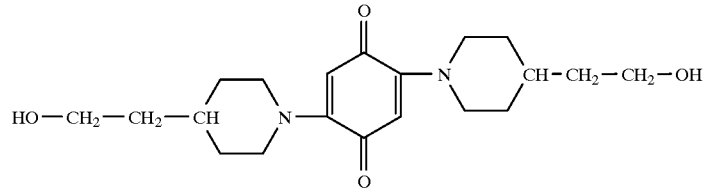
(1-6d)

(1-6e)
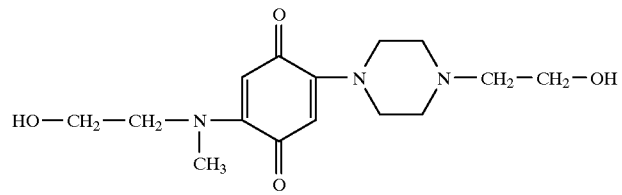
(1-7a)
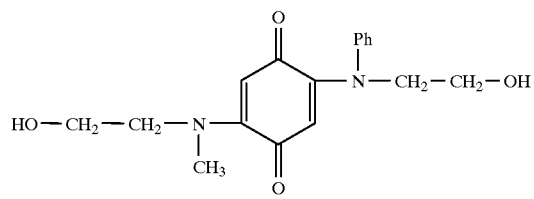
(1-7b)
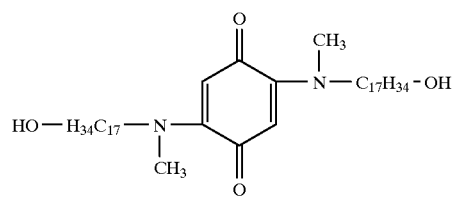
(1-7c)
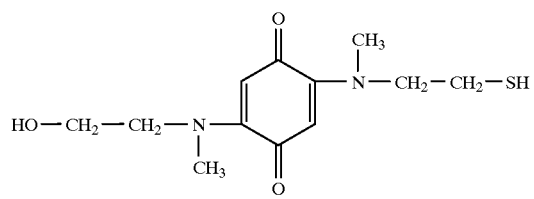
(1-7d)
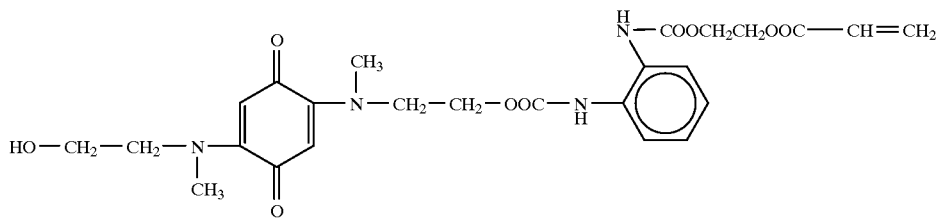
(1-7e)
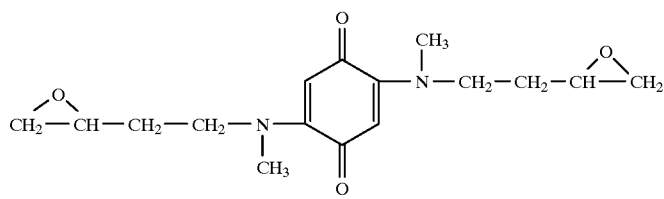
Next, a description is given of the two methods for introducing the aminoquinone structures to the polyvinyl chloride resins. (The method is not limited to these as long as the aminoquinone structures are introduced in the resin components in the present invention.)

1) A method of obtaining a polyvinyl chloride having the aminoquinone structure by polymerizing vinyl chloride monomer as shown with the formula (1-8).

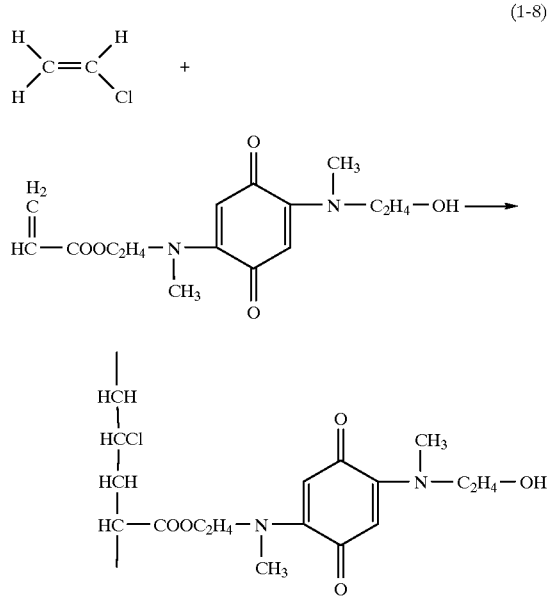

2) A method of obtaining a polyvinyl chloride having the aminoquinone structure by reacting active hydrogens and epoxy groups in a polyvinyl chloride, and grafting at side chains as shown with the formula (1-9).

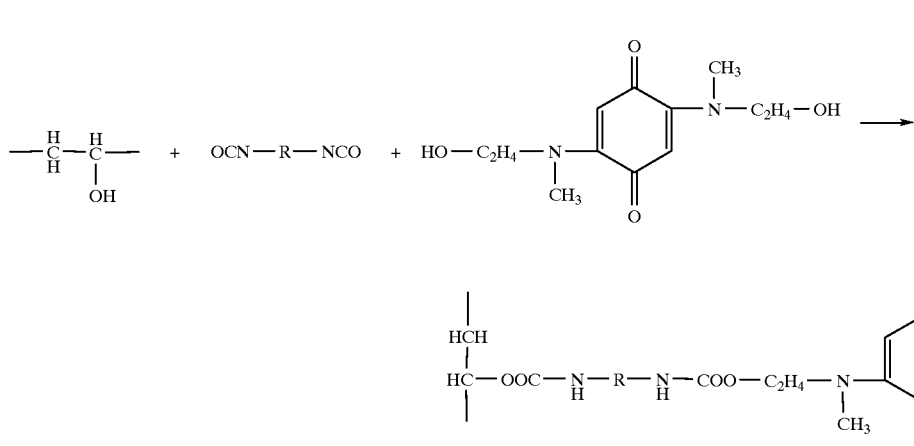

wherein
as isocyanate compositions, there are well known diisocyanate compounds such as 2,4-,2,6-tolylenediisocyanate, p-phenylene diisocyanate, diphenylmethane diisocyanate, m-phenylene diisocyanate, hexamethylene diisocyanate, tetramethylene diisocyanate, isophorone diisocyanate, and the reaction productions thereof with polyalcohol and polyisocyanate produced by condensation of isocyanate.

The degree of polymerization (i+j+k . . . ) of the above vinyl chloride copolymer is preferably $$30 \leq (i+j+K\ldots) \leq 600,$$

wherein i: the degree of polymerization of vinyl chloride monomer;

j: the degree of polymerization of a vinyl unit having the aminoquinone structure;

k: the degree of polymerization of various kinds of monomers having vinyl group capable of copolymerizing with vinyl chloride.

When the value of the degree of the polymerization (i+j+k . . . ) is less than 30, heat stability is degraded. On the other hand, when the value thereof is more than 600, its dissolution characteristic into the solvent is degraded, resulting in causing difficulty of dispersion thereof.

Further, a weight ratio of the aminoquinone monomers to the polyvinyl chloride, i.e., a weight ratio of the constitutional monomers having aminoquinone structures to the resin component containing aminoquinone structures as a constitutional unit, is preferably from 0.1 to 50 weight %. Taking account of the excellent breaking elongation, the ratio thereof is more preferable to be from 0.1 to 10 weight %.

Further, in the molecule of the polyvinyl chloride to be introduced with the aminoquinone structure, at least a polar group selected from a group shown with the formula (1-2) mentioned in the foregoing is contained.

These polar groups can be introduced therein by using well-known methods. The molecular weight per the polar group preferably falls within a range of 5,000 to 100,000. The examples thereof are shown as follows:

1) By causing —OH groups of polyvinyl chloride to react with the polar groups shown with the formula (1-10) through a dehydroclhlorinating agent, following compounds are produced as shown with the formula (1-11).

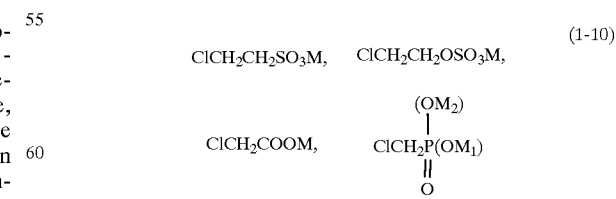

wherein

M=hydrogen atom, Li, Na, K

M1=hydrogen atom, Li, Na, K, alkyl group

M2=hydrogen atom, Li, Na, K, alkyl group

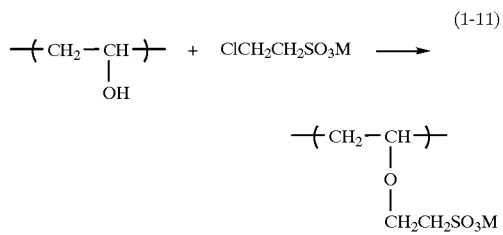
(1-11)

wherein
M=hydrogen atom, Li, Na, K

2) By causing —OH groups of polyvinyl chloride to react with the polar groups shown with the formula (1-12) and diisocyanate compounds in an equivalent mole, following compounds are produced as shown in the formula of (1-13).

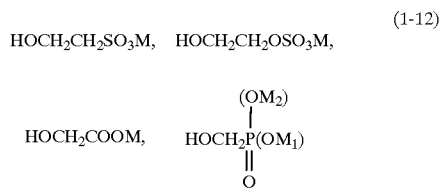
(1-12)

wherein
M=hydrogen atom, Li, Na, K
M1 =hydrogen atom, Li, Na, K, alkyl group
M2 =hydrogen atom, Li, Na, K, alkyl group

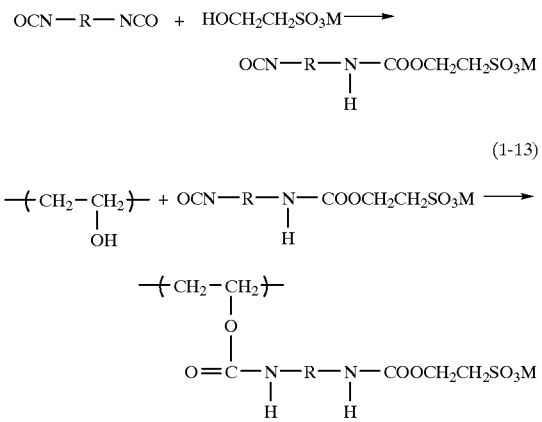
(1-13)

wherein
M=hydrogen atom, Li, Na, K

As isocyanate compositions, there are well known diisocyanate compounds such as 2,4-,2,6-tolylene diisocyanate, p-phenylene diisocyanate, diphenylmethane diisocyanate, m-phenylene diisocyanate, hexamethylene diisocyanate, tetramethylene diisocyanate, isophorone diisocyanate, and the reaction productions thereof with polyalcohol and polyisocyanate produced by condensation of isocyanates.

Further, a weight ratio of the polyvinyl chloride resin having the aminoquinone structures to the overall binder, i.e., a weight ratio of the resin component having the aminoquinone structure as a constitutional unit to the overall binder, is preferably not less than 5 weight %. The ratio of less than 5 weight % degrades the corrosion resistance of the binder greatly.

As other resin components used in the present invention, it is possible to employ the well-known conventional resins used for the magnetic recording mediums such as polyester resin, polyurethane resin, vinyl chloride copolymer, acrylic acid ester-acrylonitrile copolymer, acrylic acid esterstyrene copolymer, polyvinyl butyral, cellulose derivative, phenol resin, phenoxy resin, epoxy resin, polyamide resin and silicone resin.

It is possible to introduce polar groups shown with the formula (1-14) into the above resin components. Further it is possible to employ the resin component having the aminoquinone structures.

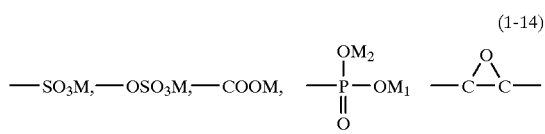
(1-14)

wherein
M=hydrogen atom, Li, Na, K
M1=hydrogen atom, Li, Na, K, alkyl group
M2=hydrogen atom, Li, Na, K, alkyl group Next, a description is given of the method of introducing the aminoquinone structure into the polyurethane resin. (It is possible to employ other methods as long as the aminoquinone structure is introduced therein.)

Generally, the polyurethane is synthesized by a condensation copolymerization of diol and diisocyanate. As the diol composition, it is common practice to employ both high molecular polyol (long-chain polyol) and diol or triol monomer according to the subjects required on properties and dispersibility.

The methods of introducing the aminoquinone structure group in the polyurethane are as follows:

1) The method of introducing the aminoquinone group into a part of dicarboxylic acid to prepare the polyester polyol as a starting raw material of the polyurethane containing the aminoquinone structure.

Specifically, this dicarboxylic acid containing the aminoquinone structure is reacted with the polyol, resulting in obtaining the polyol having the aminoquinone structure such as aminoquinone polyester polyol as the starting raw material. Thus, the polyurethane containing the aminoquinone structure is obtained by condensation-polymerizing the polyol having the aminoquinone structure along with other polyol with diisocyanate.

2) The method of introducing the aminoquinone structure to a part of diol to prepare the polyerster polyol as a starting raw material of the polyurethane containing the aminoquinone structure.

Specifically, this diol containing the aminoquinone structure is reacted with dicarboxylic acid, resulting in obtaining the polyol having the aminoquinone structure such as aminoquinone polyester polyol as a starting raw material. Thus, the polyurethane containing the aminoquinone structure is obtained in the same way as mentioned in 1).

3) The method of introducing the aminoquinone structure to a part of the diol monomer as a starting raw material of the polyurethane.

Thus, the polyurethane containing the aminoquinone structure is obtained by condensation-polymerizing the chain-polyol having the aminoquinone structure along with other polyol with diisocyanate.

In the first embodiment of the present invention, at least a polar group selected from the group shown with the formula (1-2) is introduced into the polyurethane resin along with the aminoquinone structure. This polar group can be introduced in the polyurethane by using various methods. The molecular weight per polar polar group preferably falls within a range of 5,000 to 100,000.

Next, a description is given of the methods of introducing the polar group as follows.

1) The method of introducing the polar group to a part of dicarboxylic acid to prepare the polyester polyol as the starting raw of the polyurethane containing the polar group.

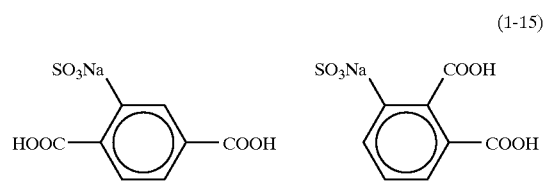

(1-15)

2) The method of introducing the polar group to a part of diol to prepare the polyester polyol as a starting raw material of the polyurethane containing the polar group.

3) The method of introducing the polar group to a part of the diol monomer as a starting raw material of the polyurethane.

4) The method of introducing the polar group by reacting active hydrogen contained in polyurethane resin with the compounds containing chloride shown with the formula (1-16). (refer to the formula (1-17))

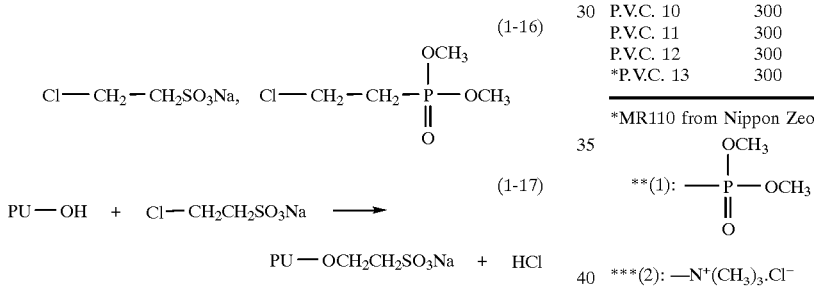

5) The method of introducing the polar group in such a manner that after reacting HO—$CH_2CH_2SO_3Na$ with 2-function isocyanate in an equivalent mole, the reaction products obtained are further reacted with the active hydrogen of the polyurethane and the remaining isocyanate group.

6) The method of introducing the polar group by reacting terminal NCO of urethane pre-polymer with the compounds having active hydrogen such as HO—$CO_2CH_2SO_3Na$.

It is possible to employ other method as long as the polar group is introduced therein.

As the polyols which contain no aminoquinone structure and no polar group, used in the polyurethane binder, there are, for instance, polyether diol, polyester diol, polycarbonate diol, and polycaprolactone diol. Other well known polyols used in synthesizing polyurethane can be also employed.

As diisocyanate components, there are well known diisocyanate compounds such as 2,4-,2,6-tolylene diisocyanate, p-phenylene diisocyanate, diphenylmethane diisocyanate, m-phenylene diisocyanate, hexamethylene diisocyanate, tetramethylene diisocyanate, isophorone diisocyanate, and the reaction productions thereof with polyalcohol and polyisocyanate produced by condensation of isocyanates.

As chain-growth agents, there are well known polyhydric alcohol, fatty acid polyamine, and aromatic polyamine.

Further, a weight ratio of the polyurethane resin having the aminoquinone structures to the overall binder, i.e., a weight ratio of the resin component having the aminoquinone structure as a constitutional unit to the overall binder, is preferably not less than 5 weight %.

The ratio of less than 5 weight % degrades the corrosion resistance of the binder.

A weight ratio of the aminoquinone monomers to the polyurethane, i.e., a weight ratio of the constitutional monomers having aminoquinone structures to the resin component containing aminoquinone structure as a constitutional unit, is preferably from 0.1 to 50 weight %. Taking account of excellent corrosion resistance, the ratio thereof is more preferable to be from 10 to 40 weight %.

Next, some examples are explained as follows.

In Tables 1-1 and 1-2, there are shown polyvinyl chloride and polyurethane resin used in embodiments and comparatives.

TABLE 1-1

| poly(vinyl chloride) | degree of polymeriz. | aminoq. monomer wt % | polar group | molecular weight per polar group |
|---|---|---|---|---|
| P.V.C. 1 | 300 | 20 | —SO3Na | 20000 |
| P.V.C. 2 | 30 | 20 | —SO3Na | 20000 |
| P.V.C. 3 | 600 | 20 | —SO3Na | 20000 |
| P.V.C. 4 | 300 | 10 | —SO3Na | 20000 |
| P.V.C. 5 | 300 | 0.1 | —SO3Na | 20000 |
| P.V.C. 6 | 300 | 30 | —OSO3Na | 12000 |
| P.V.C. 7 | 300 | 30 | —SO3Na | 12000 |
| P.V.C. 8 | 300 | 30 | —COOH | 12000 |
| P.V.C. 9 | 300 | 30 | ** (1) | 12000 |
| P.V.C. 10 | 300 | 10 | ***(2) | 12000 |
| P.V.C. 11 | 300 | 10 | none | — |
| P.V.C. 12 | 300 | 70 | —SO3Na | 12000 |
| *P.V.C. 13 | 300 | none | —SO3M | 10000 |

*MR110 from Nippon Zeon

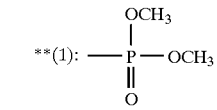

***(2): —$N^+(CH_3)_3 \cdot Cl^-$

TABLE 1-2

| polyurethane | N. Ave. Mole. Wei. | aminoq. monomer wt % | polar group | molecular weight per polar group |
|---|---|---|---|---|
| P.U. 1 | 30000 | 10 | —SO3Na | 22000 |
| P.U. 2 | 22000 | 20 | —SO3Na | 12000 |
| P.U. 3 | 10000 | 20 | **(1) | 12000 |
| P.U. 4 | 22000 | 40 | —COOH | 12000 |
| P.U. 5 | 60000 | 20 | —SO3Na | 50000 |
| P.U. 6 | 30000 | 30 | —OSO3Na | 5000 |
| P.U. 7 | 30000 | 20 | none | — |
| P.U. 8 | 30000 | 70 | —SO3Na | 20000 |
| *P.U. 9 | 30000 | none | —SO3Na | 20000 |

*UR8300 from Toyobo

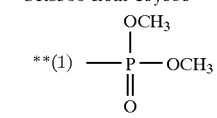

In Tables 1-1 and 1-2, SO3Na designates $SO_3Na$, and SO3M designates $SO_3M$, and OSO2Na designates $OSO_2Na$.

The above resin components were adopted to produce one of magnetic paints for forming a magnetic layer of a magnetic tape employed as a sample of the recording medium.

The compositions of the magnetic paint are shown as follows.

(Magnetic paint 1)

| | |
|---|---|
| ferromagnetic alloy powder: | 100 weight parts |
| (composition: Fe 94%, Ni 2% coercive force: 127 mA/m specific surface area: 55 m²/g length of long axis: 0.2 μm) | |
| binder: | |
| one selected from the group | |
| P.V.C. 1 to 13: | 12.5 weight parts |
| polyurethane resin: | 12.5 weight parts |
| (UR8300 Toyobo) | |
| α-alumina: | 3 weight parts |
| palmitic acid | 2 weight parts |
| methyl ethyl ketone | 100 weight parts |
| cyclohexanone | 100 weight parts |

(Magnetic paint 2)

| | |
|---|---|
| ferromagnetic alloy powder: | 100 weight parts |
| (composition: Fe 94%, Ni 2% coercive force: 127 mA/m specific surface area: 55 m²/g length of long axis: 0.2 μm) | |
| binder: | |
| one selected from the group | |
| of P.U. 1 to 9: | 12.5 weight parts |
| P.V.C.: | 12.5 weight parts |
| (MR110 from Nippon Zeon) | |
| α-alumina: | 3 weight parts |
| palmitic acid | 2 weight parts |
| methyl ethyl ketone | 100 weight parts |
| cyclohexanone | 100 weight parts |

(Magnetic paint 3)

| | |
|---|---|
| ferromagnetic alloy powder: | 100 weight parts |
| (composition: Fe 94%, Ni 2% coercive force: 127 mA/m specific surface area: 55 m²/g length of long axis: 0.2 μm) | |
| binder: | |
| mixed one: | 20 weight parts |
| (mixing at least one selected from the group of P.V.C. 1 to 13 with at least one selected from the group of P.U. 1 to 9 in an optional ratio) | |
| α-alumina: | 3 weight parts |
| palmitic acid | 2 weight parts |
| methyl ethyl ketone | 100 weight parts |
| cyclohexanone | 100 weight parts |

The respective magnetic paints were produced in such a manner that after kneading treatment of the mixture of the ferromagnetic powder and the binder, the mixture was stirred and dispersed by a sand mill, and it was further stirred after an addition of 4 weight parts of coronate L (Nippon Polyurethane Co.). The characteristics of the polyvinyl chloride resin and polyurethane resin are shown in Tables 1-1 and 1-2.

The respective magnetic tapes were produced by coating the magnetic paint on a film base so as to form a magnetic layer.

On the back surface of the magnetic tape opposite to the magnetic layer, a back coat layer mainly made of carbon black was provided. The film base was made of PET film.

After that, the base film was slit into a magnetic tape having a width of 3.81 mm for DAT (digital audio tape).

The evaluation of the electro-magnetic conversion characteristic for the sample tapes was performed by using a DAT deck (Model XD-Z505 of JVC). The head amplifier section of the DAT deck was modified so as to directly input signals from outside to magnetic heads of the DAT deck and so as to measure levels of input and output signals directly. The measurements of the characteristics were performed by recording respective sine waves of 1 MHz and 7 MHz on the magnetic tape and reproducing the recorded signals therefrom.

The evaluation of the stability was performed by comparing an initial value of the saturation magnetic flux Bm with the value thereof after a conservation durability test for 30 days under a condition of temperature of 60° C. and humidity of 90%.

The surface roughness SRa of the magnetic layer was measured by using a non-contacting type surface roughness meter. The breaking elongation (mechanical strength) was measured by using a universal type tension test device (ORIENTIC).

The results of evaluation tests are shown in Tables 1-3 and 1-4.

Table 1-3 shows the results of sample tapes employing the magnetic paint 1, wherein the embodiments (em. 1-1 to 1-9) and the comparatives (co.1-1 to 1-4) are shown.

Table 1-4 shows the results of sample tapes employing the magnetic paint 2, wherein the embodiments (em. 2-1 to 2-6) and the comparatives (co.2-1 to 2-3) are shown.

TABLE 1-3

| | P.V.C. | SRa (nm) | breaking of elong. (%) | Bm change rate (%) | *R. output level (dB) 1 M | 7 M |
|---|---|---|---|---|---|---|
| em. 1-1 | 1 | 6 | 65 | −1.7 | 0 | 0 |
| em. 1-2 | 2 | 4 | 60 | −1.7 | +0.2 | +0.2 |
| em. 1-3 | 3 | 6 | 65 | −2.0 | 0 | −0.2 |
| em. 1-4 | 4 | 4 | 80 | −1.8 | +0.2 | +0.4 |
| em. 1-5 | 5 | 4 | 85 | −2.0 | +0.2 | +0.2 |
| em. 1-6 | 6 | 6 | 60 | −1.3 | −0.5 | −0.3 |
| em. 1-7 | 7 | 6 | 60 | −1.2 | −0.5 | −0.4 |
| em. 1-8 | 8 | 7 | 60 | −1.5 | −0.5 | −0.6 |
| em. 1-9 | 9 | 6 | 60 | −1.4 | −0.4 | −0.5 |
| co. 1-1 | 10 | 15 | 40 | −12.5 | −3.5 | −4.8 |
| co. 1-2 | 11 | 13 | 45 | −25 | −4.0 | −4.3 |
| co. 1-3 | 12 | 19 | 30 | −8.5 | −1.5 | −1.8 |
| co. 1-4 | 13 | 9 | 65 | −45 | −2.0 | −2.3 |

*reproducing output level (R. output level), wherein the output levels are relative values referred to the level of the embodiment 1-1 as 0 dB.

TABLE 1-4

| | P.U. | SRa (nm) | breaking of elong. (%) | Bm change rate (%) | *R. output level (dB) 1 M | 7 M |
|---|---|---|---|---|---|---|
| em. 2-1 | 1 | 6 | 85 | −1.1 | +0.4 | +0.4 |
| em. 2-2 | 2 | 5 | 70 | −1.0 | +0.5 | +0.3 |
| em. 2-3 | 3 | 5 | 70 | −0.8 | +0.1 | +0.2 |
| em. 2-4 | 4 | 7 | 60 | −0.7 | −0.2 | −0.4 |
| em. 2-5 | 5 | 5 | 73 | −1.3 | +0.6 | +0.3 |
| em. 2-6 | 6 | 5 | 65 | −1.2 | +0.3 | +0.1 |
| co. 2-1 | 7 | 15 | 53 | −10.2 | −3.1 | −3.8 |
| co. 2-2 | 8 | 17 | 25 | −5.0 | −2.1 | −1.8 |
| co. 2-3 | 9 | 9 | 65 | −45 | −2.0 | −2.3 |

*reproducing output level (R. output level), wherein the output levels are relative values referred to the level of the embodiment 1-1 as 0 dB.

As shown in Table 1-3, wherein the P.V.C resin is used, the co.1-4 (comparative 1-4) having no aminoquinone structure in P.V.C. (polyvinyl chloride) shows the largest change rate of saturation magnetic flux density (Bm) of all the samples after the conservation durability test under a high temperature condition. This suggests that the conservation durability of co. 1-4 is the worst of all the samples because of the worst corrosion resistance.

Even though the aminoquinone structure is contained therein, both the co.1-2 having no polar group and the co.1-1 having a polar group other than the polar groups shown with the formula (1-2) show fairly larger change rate of the saturation magnetic flux density (Bm).

On the other hand, the embodiments from em.1-1 to 1-9 each having the aminoquinone structure and the specified polar group shown with the formula (1-2) show small change rates of the saturation magnetic flux density Bm (i.e. excellent corrosion resistance), excellent initial reproducing output levels and small surface roughnesses, which are related to the electro-magnetic conversion characteristics, and excellent values of breaking of elongations (mechanical strength).

As shown in Table 1-4, wherein P.U. resin is used, the co.2-3 containing no aminoquinone structure in P.U. (polyurethane) shows the largest change rate of saturation magnetic flux density (Bm) of all the samples in Table 1-4, after the conservation durability test under a high temperature condition. This suggests that the corrosion resistance thereof is the worst of all the samples because of the worst corrosion resistance.

Even though the aminoquinone structure is contained therein, the co.2-1 having no polar groups shows fairly larger change rate of the saturation magnetic flux density (Bm).

On the other hand, the embodiments from em. 2-1 to em. 2-6 each having both the aminoquinone structure (aminoquinone monomer 10 to 40 wt %) and the specified polar group shown with the formula (1-2) show small change rates of the saturation magnetic flux density Bm (i.e., excellent corrosion resistance), the excellent initial reproducing output levels and surface roughnesses, which are related to the electro-magnetic conversion characteristics, and excellent values of breaking of elongations (mechanical strength).

Thus, it will be understood from the above results that the binders introduced with the aminoquinone structures shown with the formulas (1-1a, 1-1b) or (1-3a, 1-3b) and polar groups shown with the formula (1-2) are possible to present adequately the corrosion resistance of the aminoquinone structure, resulting in providing magnetic tapes having excellent conservation durability.

Further, as will be understood from the comparatives co.1-3 and co.2-2, when the content rate of the aminoquinone monomer is as large as 70 wt %, the breaking of elongation is largely degraded like the initial reproducing output level, the surface roughness and the saturation magnetic flux density after the conservation durability test are also degraded.

Judging from the results of Tables 1-3 and 1-4, the content rate of the aminoquinone monomer in the present invention is preferably from 0.1 to 50 wt %, taking account of the conservation durability, the electro-magnetic conversion characteristic, and the mechanical strength.

When the excellent mechanical strength is required upon introducing the aminoquinone structure into the vinyl chloride resin, the content rate of the aminoquinone monomer is preferably from 0.1 to 10 wt % as seen from the em. 1-4 and em.1-5 as shown in Table 1-3.

Upon introducing the aminoquinone structure into the polyurethane, the content rate of the aminoquinone monomer is preferably from 10 to 40 wt %, taking account of overall balance with respect to excellent characteristics of the conservation durability, the electro-magnetic conversion characteristic, and the mechanical strength as shown in Table 1-4.

Next, the results of sample magnetic tapes using the magnetic paint 3 are shown in Table 1-5, wherein embodiments from em.3-1 to em.3-5 and comparatives co.3-1 and co.3-2 are shown. The data in Table 1-5 show the characteristic changes of the magnetic tapes of the embodiments and the comparatives when the content rate (wt %) of the resin component having the aminoquinone structure to the overall binder is changed.

Table 1-5

| emb. | P.U. | P.V.C. | ratio of aminoq. to resin (Wt %) | Bm change rate (%) | output level (dB) 1 M | output level (dB) 7 M |
|---|---|---|---|---|---|---|
| em. 3-1 | 1 | 13 | 70 | −0.9 | −0.1 | −0.3 |
| em. 3-2 | 1, 9 | 13 | 5 | −5.5 | +0.2 | +0.1 |
| em. 3-3 | 9 | 4 | 40 | −1.5 | +0.2 | +0.3 |
| em. 3-4 | 9 | 4, 13 | 10 | −6.1 | +0.3 | +0.1 |
| em. 3-5 | 1 | 4 | 100 | −1.0 | +0.2 | 0 |
| co. 3-1 | 1, 9 | 13 | 3 | −33.2 | −2.3 | −2.9 |
| co. 3-2 | 9 | 4, 13 | 3 | −38.1 | −3.0 | −3.1 |

*reproducing output level (R. output level), wherein the output levels are relative values referred to the level of the embodiment 1-1 as 0 dB.

As seen from the examples of the co.3-1 and co.3-2 in Table 1-5, when the content ratio of the resin component having the aminoquinone structure is as small as 3 wt %, the saturation magnetic flux density (Bm) is largely changed after the conservation durability test, and the initial reproducing output level is also small.

On the other hand, as seen from the examples of the embodiments from em.3-1 to em.3-5, when the content rate of the resin component having the aminoquinone structure is not less than 5 wt %, the saturation magnetic flux density is less changed after the conservation durability test, and the initial reproducing output level becomes much higher.

According to the first embodiment of present invention, the magnetic recording medium and the binder for use with the magnetic recording medium have various kinds of merits as follows.

(A) The binders having the resin component introduced with the aminoquinone structures shown with the formulas (1-1a, 1-1b) and (1-3a, 1-3b), and polar groups shown with the formula (1-2) are possible to present adequately the corrosion resistance of the aminoquinone structure, resulting in providing magnetic mediums having excellent conservation durability.

(B) It is possible to provide magnetic mediums having excellent conservation characteristics and electro-magnetic conversion characteristics by employing the binder, wherein a weight ratio of an amount of the resin component containing the aminoquinone to an amount of the binding means is made to be not less than 5 wt %.

(C) It is possible to provide magnetic mediums having not only excellent conservation characteristics but also excellent electro-magnetic conversion characteristics and mechanical strength and capable of high density recording by employing the binder, wherein a weight ratio of an amount of constitutional monomers each having the aminoquinone structure as a constitutional unit to an amount of the resin component containing the aminoquinone structure is made to be from 0.1 to 50 weight %.

(D) It is possible to provide magnetic mediums having more excellent mechanical strength by employing the binder, wherein the resin component containing the aminoquinone structure as a constitutional unit is made of vinyl chloride resin.

(E) It is possible to provide magnetic mediums having more balanced characteristics in the conservation characteristic, electro-magnetic conversion characteristic and a mechanical strength by employing the binder, wherein the resin component containing the aminoquinone structure as a constitutional unit is one selected from a group consisting of polyurethane resin and polyester resin.

[A Second Embodiment]

The main features of a second embodiment in the present invention are that in the recording medium formed with a magnetic layer on a substrate, the magnetic layer contains a metal ferromagnetic powder of which a particle average diameter (long axis) is 0.03 to 0.10 μm as a magnetic powder or a metal ferromagnetic powder having a specific area of 45 to 80 m²/g by BET as a magnetic powder, and a binder for binding the metal ferromagnetic powder on the substrate, and that the binder includes at least a resin component introduced with at least an aminoquinone structure selected from an aminoquinone structure group shown with formulas (2-1a) and (2-1b) as a constitutional unit.

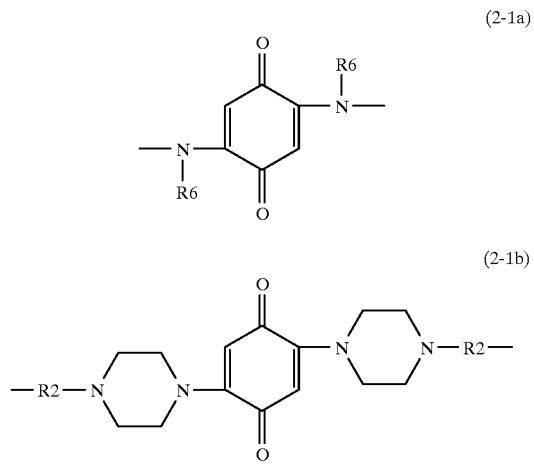

(2-1a)

(2-1b)

wherein

R6=alkyl group, aralkyl group and phenyl group

R2=alkylene group, phenylene group

As the metal ferromagnetic powder to be used, there can be employed well known materials, for instance, the alloy powder mainly composed of Fe, Ni and Co (a content rate of these elements is not less than 75%).

Other than these elements, there may be included Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B.

A weight ratio (content rate) of the aminoquinone structure shown with formulas of (2-1a) or (2-1b) to all the resin component containing the aminoquinone structure is from 0.01 to 40 weight % or preferably from 0.1 to 30 weight %. In order to enhance the dispersibility of the magnetic particles in the binder, a well known polar group as the functional group may be contained in the resin component molecules. In the formulas (2-1a) and (2-1b), it is effective to employ a tertiary amine as "N" so as to prevent the corrosion resistance of the magnetic powder as mentioned in the foregoing.

A substrate or a supporter base for forming the magnetic layer thereon is not specified in the present invention, however, it is preferable to employ one having surface roughness of not more than 20 nm, preferably not more than 15 nm so as to reduce the adverse effect on the surface roughness of the magnetic layer.

From the same reason, it is necessary to select such additives without adverse effect on the surface roughness of the magnetic layer.

Upon producing a magnetic paint, a crosslinking agent is added in the magnetic paint to improve the conservative characteristic and durability of the magnetic layer. As the crosslinking agent, there is generally employed thermosetting type polyisocyanate having 3-functional group. The more the amount of the isocyanate, the better the conservative characteristic and durability are improved. At the same time, however, this invites the degradation of the magnetic characteristic of the magnetic layer. Thus, the additional amount thereof is preferably from 10 to 50 wt % to the binding resin.

Further, when "R6" in the formula (2-1a) is made hydrogen, a reaction speed between the hydrogen and the isocyanate is too large, resulting in losing stability as the magnetic paint for a short time. Thus, it is preferable to avoid the hydrogen in view of the time limitation of the coating process.

Regarding the production method of the magnetic recording medium, it is possible to employ the well known conventional method, however, it is preferable to employ kneading treatment in the initial state where a coefficient of viscosity is high in the magnetic paint. It is also preferable to employ the steel calender treatment to obtain excellent surface of the magnetic layer on the calenderring process.

Next, a description is given of concrete embodiments from 1 to 20 of the second embodiment and comparatives from 1 to 6 as follows. In these concrete embodiments and comparatives, the magnetic taps having back coat layers were prepared as the magnetic recording medium.

<Embodiment 1>

| (1) magnetic paint | |
|---|---|
| ferromagnetic alloy powder: | 100 weight parts |
| (Fe/Ni = 98/2, average length of the long axis: 0.04 μm) | |
| binder | |
| polyurethane resin: | 12.5 weight parts |
| (the content rate of the aminoquinone structure shown with the formula (2-1a), wherein R1 is methyl group, is 15 wt %) | |
| vinyl chloride resin: | 12.5 weight parts |
| (MR110: Nippon Zeon, no aminoquinone) | |
| α-alumina | 3 weight parts |
| palmitic acid | 2 weight parts |
| methyl ethyl ketone | 100 weight parts |
| cyclohexanone | 100 weight parts |

After kneading treatment of the above mixture, the mixture was mixed and dispersed for 10 hours by a sand mill having a capacity of 5 liters. Next, the mixture was stirred after the addition of 4 weight parts of coronate L (commercial polyisocyanate crosslinking agent from Nippon Polyurethane Co.). Further, a solvent consisting of an 1:1 mixture of methyl ethyl ketone and cyclohexanone was added so that the concentration of the solid part thereof became about 30 wt %, resulting in obtaining a magnetic paint.

| (2) back coat paint | |
|---|---|
| carbon black | 100 weight parts |
| (average primary particle diameter: 20 nm) | |
| carbon black | 5 weight parts |
| (average primary particle diameter: 200 nm) | |
| nitrocellulose | 50 weight parts |
| polyurethane (UR-8300 from Toyobo) | 10 weight parts |
| polyisocyanate | 10 weight parts |
| (coronate L from Nippon polyurethane) | |

-continued

| (2) back coat paint | |
|---|---|
| methyl ethyl ketone | 500 weight parts |
| cyclohexisanone | 300 weight parts |
| toluene | 200 weight parts |

The back coat paint was obtained by mixing and dispersing the above mixture.

Next, after one hour from adding the coronate L therein, the magnetic paint prepared was coated on a polyethylene telephthalate film as a non-magnetic substrate, so that the thickness of the magnetic layer became 0.5 µm.

Further, on the back surface of the film opposite to the magnetic layer, the back coat paint prepared was coated so that the thickness of the back coat layer became 0.5 µm. After calenderring process, the film was cut into a magnetic tape having width of 12.65 mm.

Further, another tape was prepared by using the back coat paint after five hours from adding the coronate L therein.

<Embodiment 2>

The sample of magnetic tape was prepared in the same manner as that of the embodiment 1 except for substituting a long axis average length of 0.03 µm for the long axis average length of 0.04 µm in the magnetic powder of the embodiment 1.

<Embodiment 3>

The sample of the magnetic tape was prepared in the same manner as that of the embodiment 1 except for substituting the aminoquinone structure shown with the formula (2-1b), wherein R2 is CH2CH2, for the one shown with the formula (2-1a) of the embodiment 1 and causing the content rate of the aminoquinone structure to be 20 wt %.

<Embodiment 4>

The sample of magnetic tape was prepared in the same manner as that of the embodiment 1 except for substituting a long axis average length of 0.10 µm for the long axis average length of 0.04 µm in the magnetic powder of the embodiment 1.

<Embodiment 5>

The sample of the magnetic tape was prepared in the same manner as that of the embodiment 1 except for substituting the polyurethane resin (UR-8300 from TOYOBO) having no aminoquinone structure for the polyurethane resin of the embodiment 1 and substituting vinylchloride/vinylalcohol copolymer having the aminoquinone structure shown with the formula (2-1b), wherein R2 is benzyl group, for the vinyl chloride resin and causing the content rate of the aminoquinone structure to be 15 wt %.

<Embodiment 6>

The sample of the magnetic tape was prepared in the same manner as that of the embodiment 1 except for substituting the content rate of 0.1 wt % for the content rate of 15 wt % of the aminoquinone structure contained in the polyurethane resin of the magnetic paint.

<Embodiment 7>

The sample of the magnetic tape was prepared in the same manner as that of the embodiment 1 except for substituting the content rate of 30 wt % for the content rate of 15 wt % of the aminoquinone structure contained in the polyurethane resin of the magnetic paint.

<Embodiment 8>

The sample of magnetic tape was prepared in the same manner as that of the embodiment 1 except for substituting a long axis average length of 0.10 µm for the long axis average length of 0.04 µm in the magnetic powder of the embodiment 1, and substituting the aminoquinone structure shown with the formula (2-1b), wherein R2 is —CH2CH2—, for the one shown with the formula (2-1a) of the embodiment 1 and causing the content rate of the aminoquinone structure to be 20 wt %.

<Embodiment 9>

The sample of the magnetic tape was prepared in the same manner as that of the embodiment 3 except for substituting 0.2 wt % for the content rate of 20 wt % of the aminoquinone structure contained in the polyurethane resin of the magnetic paint.

<Embodiment 10>

The sample of the magnetic tape was prepared in the same manner as that of the embodiment 3 except for substituting the content rate of 30 wt % for the content rate of 20 wt % of the aminoquinone structure contained in the polyurethane resin of the magnetic paint.

<Comparative 1>

The sample of magnetic tape was prepared in the same manner as that of the embodiment 1 except for substituting a long axis average length of 0.12 µm for the long axis average length of 0.04 µm in the magnetic powder of the embodiment 1.

<Comparative 2>

The sample of the magnetic tape was prepared in the same manner as that of the embodiment 1 except for substituting the polyurethane resin (UR-8300 from TOYOBO) having no aminoquinone structure for the polyurethane resin of the embodiment 1.

<Comparative 3>

The sample of the magnetic tape was prepared in the same manner as that of the embodiment 1 except for substituting R6=hydrogen for R6=methyl group in the aminoquinone structure shown with the formula (2-1a) in the embodiment 1.

It was impossible to produce the magnetic powder containing magnetic particles each having an average length of long axis of not more than 0.02 µm.

The evaluation tests of the magnetic tapes prepared in the embodiments 1-10 and the comparatives 1-3 were performed by using a drum tester as follows.

drum diameter: 21.7 mm number of revolution: 150 rev/sec specific speed of the magnetic head: 10.2 m/sec material of the magnetic head: iron nitride, Bs=1300 mT gap length: 0.2 µm track width: 10 µm The evaluation test were performed by measuring recording-reproducing output levels at the signal of 21 MHz and S/N (a ratio of the signal output level to the noise level). The recording wavelength of the signal recorded on the magnetic tape is calculated as 0.49 µm. The results are shown in Table 2-1, wherein each of data obtained are shown as a relative value when the output level of com. 2 is made 0 dB.

TABLE 2-1

| | coated after 1 hr from add. | | after 5 hr | |
|---|---|---|---|---|
| | reprod. out. level (dB) | S/N (dB) at 21 MHz | S/N (dB) at 21 MHz | change amount of S/N (dB) |
| emb. 1 | +7.2 | +10.5 | +10.5 | 0.0 |
| emb. 2 | +6.8 | +10.5 | +10.4 | −0.1 |
| emb. 3 | +8.0 | +9.9 | +9.7 | −0.2 |
| emb. 4 | +9.1 | +9.0 | +8.9 | −0.1 |
| emb. 5 | +7.8 | +10.1 | +9.9 | −0.2 |

TABLE 2-1-continued

|  | coated after 1 hr from add. | | after 5 hr | |
|---|---|---|---|---|
|  | reprod. out. level (dB) | S/N (dB) at 21 MHz | S/N (dB) at 21 MHz | change amount of S/N (dB) |
| emb. 6 | +6.1 | +8.2 | +8.1 | −0.1 |
| emb. 7 | +6.9 | +11.0 | +10.9 | −0.1 |
| emb. 8 | +9.5 | +9.0 | +8.8 | −0.2 |
| emb. 9 | +6.5 | +8.6 | +8.6 | 0.0 |
| emb. 10 | +7.7 | +11.0 | +11.0 | 0.0 |
| com. 1 | +8.8 | +5.8 | +5.6 | −0.2 |
| com. 2 | 0 | 0 | −4.7 | −4.7 |
| com. 3 | +7.0 | +8.8 | +4.2 | −4.6 |

As seen from Table 2-1, the electro-magnetic conversion characteristics of the respective embodiments are superior to that of the comparative 2 (having no aminoquinone structure) in the reproducing output level (reprod. out. level) and the S/N (ratio of the signal reproducing output level to the noise level). This indicates that the dispersibility of the magnetic powder was improved by the addition of the aminoquinone structure.

Further, as will be understood from the embodiments from 1 to 10, the respective magnetic tapes coated with the magnetic paint after a lapse of five hours from the addition of polyisocyanate as the crosslinking agent show more excellent electro-magnetic conversion characteristics compared to that of the comparative 2, and also show no significant change amount of S/N (amount of change), wherein the change amount of S/N is defined as a difference between the S/N of magnetic tape employing the magnetic paint after the lapse of 1 hour and one after the lapse of 5 hours. This indicates that the respective magnetic paints of the embodiments from 1 to 10 maintain the more excellent dispersibility of the magnetic powder for long time, and are more excellent in quality stability compared with the magnetic tape of the comparative 2.

In the comparative 1, (wherein the average length of the long axis of the magnetic particles in the powder is as long as 0.12 μm), the change amount of S/N is fairly small, however, the S/N value itself is smaller. This suggests that the electro-magnetic conversion characteristic of the comparative 2 is inferior to those of the embodiments from 1 to 10.

In the comparative 3, (wherein R1 of the aminoquinone structure shown with the formula (2-1a) is hydrogen), the magnetic tape coated with the magnetic paint after a lapse of 1 hour from the addition of polyisocyanate shows the excellent electro-magnetic conversion characteristics as in the embodiments from 1 to 10, however, the one after the lapse of 5 hours is largely degraded in the electro-magnetic conversion characteristics. This indicates that the magnetic paint of the comparative 3 can not maintain the dispersibility of the magnetic powder for a long time, i.e., degraded in the dispersion stability.

As seen from the results of the embodiments 4 and 8, (wherein the average length of the long axis of the respective magnetic particles are 0.1 μm), and the comparative 1, (wherein the average length of the long axis thereof is 0.12 μm), the maximum value of the long axis of the respective magnetic particles are 0.10 μm, taking account of the excellent dispersibility of the magnetic powder for a long time and electro-magnetic conversion characteristics. Further, the minimum average value of the long axis of the magnetic particles is 0.03 μm, in view of a fact that the magnetic powder each particle having a length of long axis of not more than 0.02 μm can not be produced, and the result of the embodiment 2 (wherein the average length of the long axis is 0.03 μm).

Next, a description is given of embodiments from 11 to 20 and comparatives from 4 to 6, wherein a concept of the BET specific surface area of the magnetic powder is introduced.

<Embodiment 11>

In the embodiment 1, the ferromagnetic alloy powder thereof was substituted the magnetic powder composed of Fe/Ni=98/2 and having a BET specific surface area of 45 $m^2/g$ for, and the magnetic paint was coated on the substrate after a lapse of 10 hours from adding polyisocyanate (coronate L: Nippon polyurethane Co.) as the crosslinking agent. Other conditions were made the same as those of the embodiment 1.

<Embodiment 12>

In the embodiment 11, the ferromagnetic alloy power thereof was substituted one having the BET specific surface area of 55 $m^2/g$ for.

Other conditions were made the same as those of the embodiment 11.

<Embodiment 13>

In the embodiment 11, the BET specific surface area of the magnetic powder to be used was substituted 65 $m^2/g$ for 45 $m^2/g$, and the aminoquinone structure was substituted one shown with the formula (2-1b), (wherein R2 is CH2CH2, for, and the content rate of the aminoquinone was substituted 20 wt % for. Other conditions were made the same as those of the embodiment 11.

<Embodiment 14>

In the embodiment 11, the BET specific surface area of the magnetic powder to be used was substituted 80 $m^2/g$ for 45 $m^2/g$.

Other conditions were made the same as those of the embodiment 11.

<Embodiment 15>

In the embodiment 11, the polyurethane resin used for the magnetic paint was substituted the resin having no aminoquinone structure (UR-8300, TOYOBO) for, and the vinyl chloride resin was substituted vinylchloride/vinylalcohol copolymer containing the aminoquinone structure shown with the formula (2-1b), (wherein R2 is benzyl group) for, and the content rate of the aminoquinone structure was substituted 15 wt % for. Other conditions were made the same as those of the embodiment 11.

<Embodiment 16>

In the embodiment 11, the content rate of 15 wt % of the aminoquinone structure contained in the polyurethane resin of the magnetic paint was substituted 0.1 wt % for. Other conditions were made the same as those of the embodiment 11.

<Embodiment 17>

In the embodiment 11, the content rate of 15 wt % of the aminoquinone structure contained in the polyurethane resin of the magnetic paint was substituted 30 wt % for. Other conditions were made the same as those of the embodiment 11.

<Embodiment 18>

In the embodiment 11, the BET specific surface area of the magnetic powder to be used was substituted 50 $m^2/g$, and the aminoquinone structure was substituted one shown with the formula (2-1b), (wherein R2 is CH2CH2, for, and the content rate of the aminoquinone was substituted 20 wt % for. Other conditions were made the same as those of the embodiment 11.

<Embodiment 19>

In the embodiment 13, the content rate of 20 wt % of the aminoquinone structure contained in the polyurethane resin of the magnetic paint was substituted 0.2 wt % for. Other conditions were made the same as those of the embodiment 13.

<Embodiment 20>

In the embodiment 13, the content rate of 20 wt % of the aminoquinone structure contained in the polyurethane resin of the magnetic paint was substituted 30 wt % for. Other conditions were made the same as those of the embodiment 13.

<Comparative 4>

In the embodiment 11, the BET specific surface area of the magnetic powder to be used was substituted 40 $m^2/g$.

Other conditions were made the same ones as those of the embodiment 11.

<Comparative 5>

In the embodiment 11, the polyurethane resin of the magnetic resin was substituted the polyurethane resin (UR-8300, TOYOBO) having no aminoquinone structure for. Other conditions were made the same as those of the embodiment 11.

<Comparative 6>

In the embodiment 11, R1=methyl group of the aminoquinone structure shown with the formula (2-1a) was substituted R6=hydrogen for. Other conditions were made the same as those of the embodiment 11.

Incidentally, it was impossible to produce the magnetic powder having BET specific surface area of more than 80 $m^2/g$.

The magnetic tapes prepared in the above embodiments from 11 to 20 and the comparatives from 4 to 6 were measured with respect to S/N (signal to noise ratio) as the electro-magnetic conversion characteristic. In the measurement, the same drum tester mentioned in the foregoing was used. The results were shown in Table 2-2, wherein the respective values of the S/N were obtained as a relative value by making the measurement value of the comparative 5 "0" dB.

Further, the viscosity of the magnetic paint was measured in different stages shown as follows by using the B-type viscometer and the values obtained were shown in Table 2-2.

(1) the viscosity at the completion of the dispersion (before adding the crosslinking agent).

(2) the viscosity just after adding the crosslinking agent (C.A).

(3) the viscosity at coating (after a lapse of 10 hours from adding the crosslinking agent).

TABLE 2-2

|  | S/N (dB) at 21 MHz | viscosity of magnetic paint (Pa · s) | | |
|---|---|---|---|---|
|  |  | at completion of dispersion | just after add. of C.A | at coating |
| emb. 11 | +6.8 | 500 | 2.2 | 4.3 |
| emb. 12 | +7.1 | 640 | 1.9 | 4.4 |
| emb. 13 | +7.7 | 690 | 2.1 | 4.8 |
| emb. 14 | +8.2 | 810 | 2.0 | 4.8 |
| emb. 15 | +7.5 | 440 | 2.0 | 3.9 |
| emb. 16 | +5.9 | 720 | 1.9 | 4.5 |
| emb. 17 | +7.4 | 410 | 1.7 | 4.0 |
| emb. 18 | +6.9 | 550 | 2.0 | 4.2 |
| emb. 19 | +6.3 | 710 | 1.9 | 4.2 |
| emb. 20 | +7.7 | 400 | 1.7 | 3.8 |
| com. 4 | +3.8 | 320 | 1.7 | 4.2 |
| com. 5 | 0 | impossible | 2.5 | 12.5 |
| com. 6 | +2.7 | 550 | 2.5 | 11.0 |

As seen from the results of Table 2-2, the electro-magnetic conversion characteristic (S/N) of the respective embodiments from 11 to 20 are more excellent compared with that of the comparative 5. This reason is considered because of the improvements of dispersibility of the magnetic powder and dispersion stability by introducing the aminoquinone structure into the resin component.

Further, the value of viscosity of the magnetic paint after the lapse of 10 hours in the respective embodiments 11-20 are increased much less than that of the comparative 5. This indicates that the magnetic paints of the embodiments from 11 to 20 retain a good paint viscosity for a long time after the crosslinking agent is added in the magnetic paints, and the quality stability is excellent.

The comparative 4, (wherein the magnetic powder has a BET specific area of as small as 40 $m^2/g$), shows less increment in the viscosity of the magnetic paint after the lapse of 10 hours from the addition of the crosslinking agent, but the S/N thereof is degraded compared with those of the embodiments from 11 to 20.

The comparative 6, (wherein R6 of the aminoquinone structure shown with the formula (2-1a) is substituted R1=hydrogen), shows a smaller value of S/N. This indicates that the electro-magnetic conversion characteristic of the comparative 6 is degraded compared to those of the embodiments from 11 to 20. Further, judging from the larger incremental amount of the viscosity of the magnetic paint after the lapse of 10 hours, the comparative 6 is degraded in the stability of the paint viscosity and the dispersion stability of the magnetic powder compared with those of the embodiments 11–20.

From the results of the embodiments 11, 15–17 (wherein the BET specific surface area of the magnetic powder is 45 $m^2/g$) and the result of the comparative 4 (wherein the BET specific surface area is 40 $m^2/g$), the minimum value of the BET specific surface area of the magnetic powder is preferably 45 $m^2/g$, in view of the excellent electro-magnetic conversion characteristics and the excellent paint viscosity for a long time. Further, the maximum value of the BET specific surface area of the magnetic powder is preferably 80 $m^2/g$, taking account of facts that the magnetic powder having the BET specific surface area of more than 80 $m^2/g$ can not be produced and that the example of the embodiment 14 (wherein the BET specific surface area of 80 $m^2/g$) can be produced.

It is also possible to employ the metal ferromagnetic powder having particles of the length of long axis ranging from 0.03 to 0.1 μm and having the BET specific surface area ranging from 45 to 80 $m^2/g$.

According to the second embodiment of the present invention, it is possible to provide a magnetic paint having excellent dispersibility of the magnetic powder and capable of maintaining the excellent dispersibility for a long time after adding the crosslinking agent to enhance the durability thereof. Thus, it is possible to provide magnetic recording mediums having excellent electro-magnetic conversion characteristic in the short wave magnetic recording and having excellent quality stability without the limitation of painting time in the painting process.

A Third Embodiment

A third embodiment of the present invention relates to a coating type magnetic recording medium. The main features of the third embodiment are that in the recording medium formed with a magnetic layer on a substrate, a resin component is at least employed as a component of a binder for forming the magnetic layer, and the resin component contains at least an aminoquinone structure selected from the aminoquinone structure group shown with formulas (3-1a) and (3-1b) as a constitutional unit, and that the saturation magnetic flux density Bs of the magnetic layer is made to be within a range from 0.35 T to 0.55 T and that the thickness of the magnetic layer is made to be within a range from 0.08 μm to 0.25 μm.

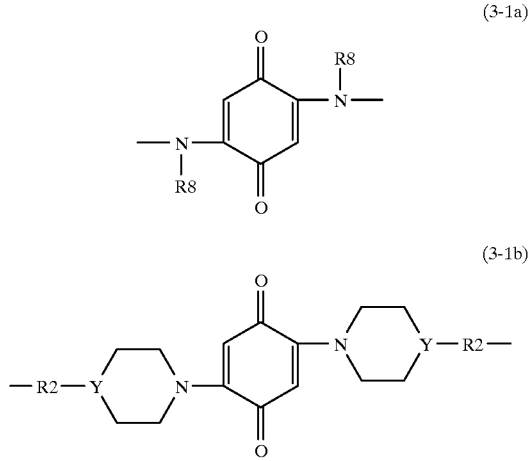

wherein
R8=hydrogen, alkyl group, aralkyl group and phenyl group.
R2=alkylene group, phenylene group
Y=N, CH As the ferromagnetic powder to be used in the present invention, there can be employed well-known ferromagnetic powder, for instance, the magnetic alloy powder mainly composed of Fe, Ni and Co.

Other than these elements, there may be included Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B The size of the particles of the magnetic powder is 25 to 80 m$^2$/g by the specific surface area of BET, preferably 35 to 75 m$^2$/g. When it is less than 25 m$^2$/g, the background noise is increased, and when it is more than 80 m$^2$/g, it is difficult to produce the magnetic powder. The crystalline size in the magnetic particles is not more than 0.03 μm, preferably, 0.01 to 0.025 μm. The length of a long axis of the magnetic particle is preferably not more than 0.2 μm.

As resin components used in the present invention, it is possible to use the well-known conventional resin such as polyester resin, polyurethane resin, vinyl chloride copolymer, acrylic acid ester-acrylonitrile copolymer, acrylic acid ester-styrene copolymer, polyvinyl butyral, cellulose derivative, phenol resin, phenoxy resin, epoxy resin, polyamide resin and silicone resin.

It is possible to introduce polar groups such as SO$_3$M, and —OSO$_3$M in these resins.

The content rate (or weight ratio) of the aminoquinone structure shown with the formula (3-1a), (3-1b) contained in the resin component to all amount of the resin components in the binder is from 0.01 to 40 wt %, preferably from 0.1 to 30 wt %. It is possible to introduce polar groups into the resin component to enhance the dispersibility of the magnetic powder.

The weight ratio of the resin component (for instance, urethane resin as mentioned hereinafter) introduced with the aminoquinone structure to all the resin component in the binder is preferably from 10 to 80 wt %.

The corrosion resistance of the magnetic powder can be more improved by employing tertiary nitrogen as the "N" shown in the formulas (3-1a) and (3-1b) as mentioned in the foregoing.

The aminoquinone structure shown with the formulas (3-1a) and (3-1b) is introduced in the resin components by employing the aminoquinone monomer shown with (3-2a) and (3-2b). (In the formulas (3-2a) and (3-2b), the contents of "R8" is the same as those in the formula (3-1a).

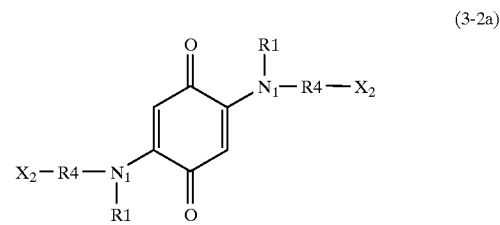

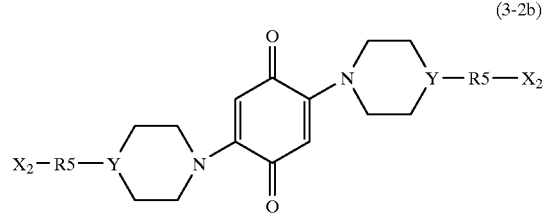

wherein
R4: hydrocarbon group having a carbon number of 2 to 150.
R5: hydrocarbon group having a carbon number of 1 to 6.
Y: N, CH
X$_1$: hydroxyl group, amino group and carboxylic acid group As examples of aminoquinone monomers, there are ones shown with formulas (3-3a) to (3-3d).

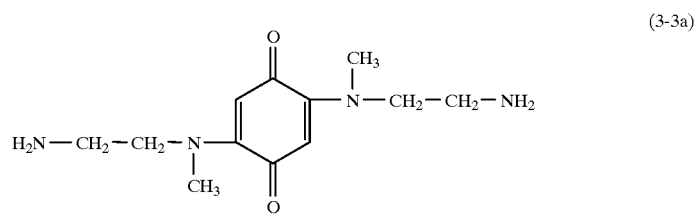

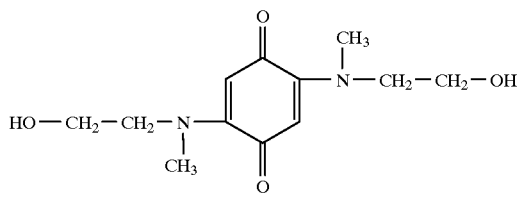
(3-3b)

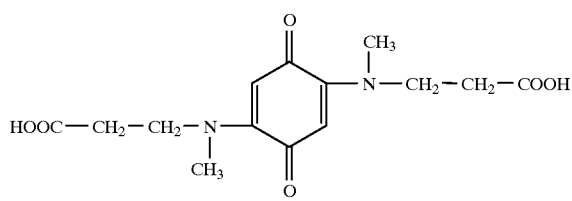
(3-3c)

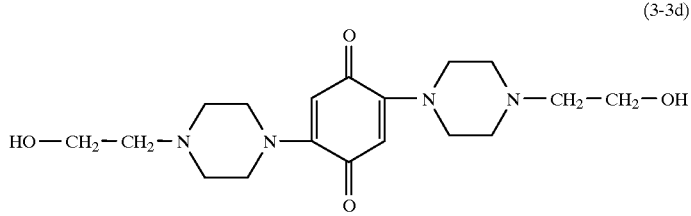
(3-3d)

Next, a description is given of the method of introducing the aminoquinone structure into the polyurethane resin.

As mentioned in the first embodiment, the polyurethane is generally synthesized by a condensation copolymerization of diol and diisocyanate. As the diol component, it is general to employ both high molecular polyol (long-chain polyol) and dior or triol monomer according to the subjects required on properties and dispersibility.

The methods of introducing the aminoquinone structure in the polyurethane are as follows:

1) The method of introducing the aminoquinone structure into a part of dicarboxylic acid to prepare the polyester polyol as a starting raw material of the polyurethane containing the aminoquinone structure.

Specifically, this dicarboxylic acid containing the aminoquinone structure is reacted with the polyol, resulting in obtaining the polyol having the aminoquinone structure such as aminoquinone polyester polyol as the starting raw material. Thus, the polyurethane containing the aminoquinone structure is obtained by condensation-polymerizing the polyol having the aminoquinone structure along with other polyol with diisocyanate.

2) The method of introducing the aminoquinone structure to a part of diol to prepare the polyester polyol as a starting raw material of the polyurethane containing the aminoquinone structure.

Specifically, this diol containing the aminoquinone structure is reacted with dicarboxylic acid, resulting in obtaining the polyol having the aminoquinone structure such as aminoquinone polyester polyol as a starting raw material. Thus, the polyurethane containing the aminoquinone structure is obtained in the same way as mentioned in 1).

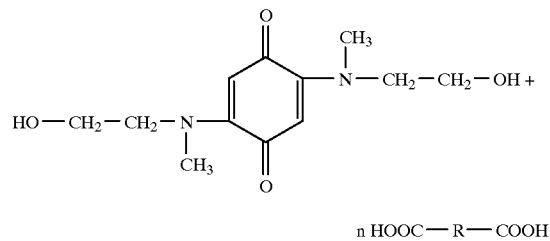
(3-5)

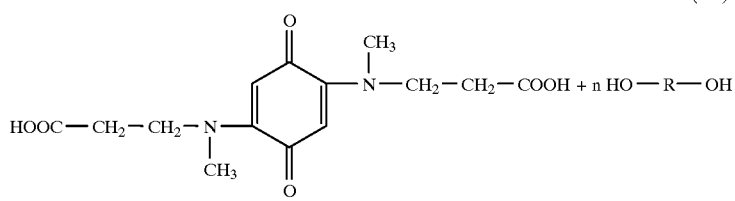
(3-4)

3) The method of introducing the aminoquinone structure to a part of the diol monomer as a starting raw material of the polyurethane.

Thus, the polyurethane containing the aminoquinone structure is obtained by condensation-polymerizing the chain-polyol having the aminoquinone structure along with other polyol with diisocyanate.

(3-6)

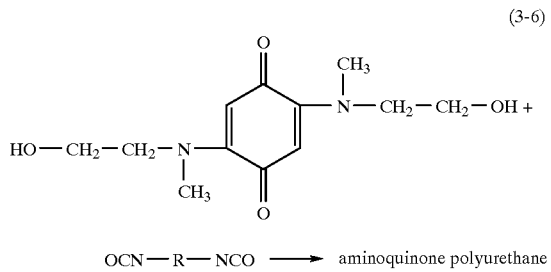

It is possible to employ other methods as long as the aminoquinone structure is introduced therein.

As polyol components having no aminoquinone structure and no polar group used in the polyurethane binder, there are, for instance, polyether diol, polyester diol, polycabonate diol, and polycaprolactone diol. Other well known polyols used in synthesizing polyurethane can be also employed.

As diisocyanate components, there are well known diisocyanate compounds such as 2,4-,2,6-tolylene diisocyanate, p-phenylene diisocyanate, diphenylmethane diisocyanate, m-phenylene diisocyanate, hexamethylene diisocyanate, tetramethylene diisocyanate, isophorone diisocyanate, and the reaction productions thereof with polyalcohol and polyisocyanate produced by condensation of isocyanates.

As chain-growth agents, there are well known polyhydric alcohol, fatty acid polyamine, and aromatic polyamine.

Next, a description is given of the concrete embodiments of the third embodiment and comparative samples. In these embodiments and comparatives, the magnetic tapes having a back coat layer were produced.

[The composition of the magnetic layer used in the embodiments and comparatives]

| | |
|---|---|
| (1) ferromagnetic powder | 100 weight parts |

(composition: Fe 70–90%, Co 10 to 30%)
coercive force: 156 to 178 kA/m
specific surface area: 55 to 70 m²/g
length of long axis: 0.08 to 0.11 μm
saturation magnetization σs: 125 to 200 emu/g
(controlled by an amount of Co and the thickness of an oxidized surface layer of the magnetic particle)
(2) binder

| | |
|---|---|
| polyurethane resin | 12.5 weight parts |
| (a content rate of the aminoquinone structure shown with the formula (3-1a) (wherein R1 is methyl group) is made 4 wt %) | |
| vinyl chloride resin | 12.5 weight parts |
| (MR 110 from Nippon Zeon) | |
| α-alumina | 3 weight parts |
| myristic acid | 1 weight parts |
| butylstearate | 1 weight parts |
| methyl ethyl ketone | 100 weight parts |
| cyclohexanone | 100 weight parts |

The respective magnetic paints were prepared in such a manner that after kneading treatment of the mixture of the ferromagnetic powder and the binder, the mixture was stirred and dispersed by a sand mill, and it was further stirred after addition of 4 weight parts of coronate L (Nippon Polyurethane Co.). The respective magnetic tapes were prepared by coating the magnetic paint on a film base of PEN (polyethylene naphtharate) having a thickness of 6.8 μm so as to form a magnetic layer thereon. After forming a back coat layer mainly composed of carbon black on the back surface opposite to the magnetic layer and calenderring process, the magnetic tape was obtained by slitting the film base into a width of 6.35 mm.

<Embodiment 1>

In the above composition of the magnetic layer, the value of the saturation magnetization σs of the ferromagnetic powder used was made 125 emu/g, and the coercive force Hc was made 156 kA/m, and the thickness of the magnetic layer was controlled to be 0.15 μm.

<Embodiment 2>

In the above composition of the magnetic layer, the value of the saturation magnetization σs of the ferromagnetic powder used was made 173 emu/g, and the coercive force Hc was made 169 kA/m, and the thickness of the magnetic layer was controlled to be 0.13 μm.

<Embodiment 3>

In the above composition of the magnetic layer, the value of the saturation magnetization σs of the ferromagnetic powder used was made 200 emu/g, and the coercive force Hc was made 163 kA/m, and the thickness of the magnetic layer was controlled to be 0.13 μm.

<Embodiment 4>

In the above composition of the magnetic layer, the value of the saturation magnetization σs of the ferromagnetic powder used was made 142 emu/g, and the coercive force Hc was made 178 kA/m, and the thickness of the magnetic layer was controlled to be 0.08 μm.

<Embodiment 5>

In the above composition of the magnetic layer, the value of the saturation magnetization σs of the ferromagnetic powder used was made 153 emu/g, and the coercive force Hc was made 175 kA/m, and the thickness of the magnetic layer was controlled to be 0.13 μm.

<Embodiment 6>

In the above composition of the magnetic layer, the value of the saturation magnetization σs of the ferromagnetic powder used was made 132 emu/g, and the coercive force Hc was made 170 kA/m, and the thickness of the magnetic layer was controlled to be 0.25 μm.

<Embodiment 7>

In the above composition of the magnetic layer, the value of the saturation magnetization σs of the ferromagnetic powder used was made 125 emu/g, and the coercive force Hc was made 156 kA/m, and the polyurethane resin including the aminoquinone structure shown with the formula (3-1a) is substituted the polyurethane resin including the aminoquinone structure shown with the formula (3-1b) (wherein R2 is CH₂CH₂-) for, and the content rate of the aminoquinone structure thereof is made 4 wt %, and the thickness of the magnetic layer was controlled to be 0.15 μm.

<Embodiment 8>

In the above composition of the magnetic layer, the polyurethane resin including aminoquinone structure shown with the formula (3-1a) is substituted the polyurethane resin (UR8300 from Toyobo) having no aminoquinone structure for, and the vinyl chloride resin is substituted vinyl chloride/vinyl alcohol copolymer including the aminoquinone structure shown with the formula (3-1b) (wherein R2 is the benzyl group) for, and the content rate of the aminoquinone structure shown with formula (3-1b) is made 4 wt %. Further, the value of the saturation magnetization σs of the ferromagnetic powder used was made 158 emu/g, and the coercive force Hc was made 175 kA/m, and the thickness of the magnetic layer was controlled to be 0.14 μm.

<Embodiment 9>

In the above composition of the magnetic layer, the value of the saturation magnetization σs of the ferromagnetic powder used was made 153 emu/g, and the coercive force Hc was made 175 kA/m, the content rate of the aminoquinone structure shown with the formula (3-1a) (wherein R8 is methyl group) is made 5 wt %, and the thickness of the magnetic layer was controlled to be 0.14 μm.

<Embodiment 10>

In the above composition of the magnetic layer, the value of the saturation magnetization σs of the ferromagnetic powder used was made 160 emu/g, and the coercive force Hc was made 175 kA/m, the content rate of the aminoquinone structure shown with the formula (3-1a) (wherein R8 is methyl group) is made 10 wt %, and the thickness of the magnetic layer was controlled to be 0.13 μm.

<Comparative 1>

In the above composition of the magnetic layer, the value of the saturation magnetization σs of the ferromagnetic powder used was made 138 emu/g, and the coercive force Hc was made 178 kA/m, and the thickness of the magnetic layer was controlled to be 0.06 μm.

<Comparative 2>

In the above composition of the magnetic layer, the polyurethane resin including aminoquinone structure shown with the formula (3-1a) is substituted the polyurethane resin (UR8300 from Toyobo) having no aminoquinone structure for, and the value of the saturation magnetization σs of the ferromagnetic powder used was made 94 emu/g, and the coercive force Hc was made 160 kA/m, and the thickness of the magnetic layer was controlled to be 0.14 μm.

<Comparative 3>

In the above composition of the magnetic layer, the polyurethane resin including aminoquinone structure shown with the formula (3-1a) is substituted the polyurethane resin (UR8300 from Toyobo) having no aminoquinone structure for, and the value of the saturation magnetization σs of the ferromagnetic powder used was made 114 emu/g, and the coercive force Hc was made 156 kA/m, and the thickness of the magnetic layer was controlled to be 0.13 μm.

<Comparative 4>

In the above composition of the magnetic layer, the polyurethane resin including aminoquinone structure shown with the formula (3-1a) is substituted the polyurethane resin (UR8300 from Toyobo) having no aminoquinone structure for, and the value of the saturation magnetization σs of the ferromagnetic powder used was made 173 emu/g, and the coercive force Hc was made 173 kA/m, and the thickness of the magnetic layer was controlled to be 0.15 μm.

<Comparative 5>

In the above composition of the magnetic layer, the value of the saturation magnetization σs of the ferromagnetic powder used was made 206 emu/g, and the coercive force Hc was made 175 kA/m, and the thickness of the magnetic layer was controlled to be 0.14 μm.

<Comparative 6>

In the above composition of the magnetic layer, the polyurethane resin including aminoquinone structure shown with the formula (3-1a) is substituted the polyurethane resin (UR8300 from Toyobo) having no aminoquinone structure for, and the value of the saturation magnetization σs of the ferromagnetic powder used was made 136 emu/g, and the coercive force Hc was made 170 kA/m, and the thickness of the magnetic layer was controlled to be 0.35 μm.

<Comparative 7>

In the above composition of the magnetic layer, the polyurethane resin including aminoquinone structure shown with the formula (3-1a) is substituted the polyurethane resin (UR8300 from Toyobo) having no aminoquinone structure for, and the value of the saturation magnetization σs of the ferromagnetic powder used was made 131 emu/g, and the coercive force Hc was made 158 KA/m, and the thickness of the magnetic layer was controlled to be 1.3 μm.

<Comparative 8>

In the above composition of the magnetic layer, the value of the saturation magnetization σs of the ferromagnetic powder used was made 107 emu/g, and the coercive force Hc was made 161 kA/m, and the thickness of the magnetic layer was controlled to be 0.13 μm.

<Comparative 9>

In the above composition of the magnetic layer, the polyurethane resin including aminoquinone structure shown with the formula (3-1a) is substituted the polyurethane resin (UR8300 from Toyobo) having no aminoquinone structure for, and the value of the saturation magnetization σs of the ferromagnetic powder used was made 158 emu/g, and the coercive force Hc was made 175 kA/m, and the thickness of the magnetic layer was controlled to be 0.13 μm.

Regarding the above embodiments from 1 to 10 and the comparatives from 1 to 9, the evaluation tests were performed as follows.

The electro-magnetic conversion characteristics were measured by using a deck with a rotary drum having a diameter of 21.7 mm and a revolution number of 150 r/sec and laminated type magnetic heads of iron nitride (Saturation magnetic flux density of 1.4 T, a track width of 10 μm and a gap length of 0.18 μm). The relative speed between the magnetic tape and the magnetic head was 10.2 m/sec.

The recording sinusoidal wave signal of 20.8 MHz (recording wave length of 0.49 μm) was recorded on the respective sample tapes, and values of C/N (dB) thereof were measured by comparing a reproducing output level with a noise level of the respective magnetic tapes at 18.8 MHz.

Further, as the durability test, a occuring number of signal dropouts, stain and scratches on the surface of the magnetic head were measured and evaluated after a 100 hour running test under a condition of temperature of 40° C. and humidity of 85% regarding the magnetic tapes.

The number of signal dropouts was defined as follows.

A series of the reproducing output level decreasing more than 20 dB for 5 μs was defined as one dropout. The number of the signal dropouts was counted for a minute, and a mean value of the number of the signal dropouts for one minute over a whole length of the magnetic tape was defined as the number of signal dropouts regarding the corresponding magnetic tape.

With respect to the stain and scratches of the magnetic head, they were observed under a microscope of 400 magnification and evaluated by using a five step evaluation method from "A" rank (excellent) to "E" rank (bad).

There are shown in Table 3-1 the results of the evaluation, the thicknesses of magnetic layers, the saturation magnetic flux densities Bs, squareness ratios Br/Bs, wherein Br designates a remanent magnetic flux density. Incidentally, the more the value of the squareness ratio is going on 1, the more the reproducing output characteristic is improved.

TABLE 3-1

| * | "t" (μm) | Bs (T) | Br/Bs | sig. dropout before | sig. dropout after | mag. head scr. | mag. head stain | 20.8 MHz C/N (dB) |
|---|---|---|---|---|---|---|---|---|
| a emb. 1 | 0.15 | 0.356 | 0.88 | 10 | 6 | A | A | 0 |
| a emb. 2 | 0.13 | 0.48 | 0.86 | 12 | 10 | A | A | +1.0 |
| a emb. 3 | 0.13 | 0.548 | 0.84 | 7 | 9 | A | B | +0.2 |
| a emb. 4 | 0.08 | 0.402 | 0.89 | 11 | 13 | A | A | +1.2 |
| a emb. 5 | 0.13 | 0.431 | 0.87 | 8 | 10 | A | A | +1.5 |
| a emb. 6 | 0.25 | 0.368 | 0.88 | 6 | 4 | A | A | +0.2 |
| a emb. 7 | 0.15 | 0.36 | 0.89 | 8 | 6 | A | B | +0.1 |
| b emb. 8 | 0.14 | 0.441 | 0.89 | 6 | 6 | A | A | +1.7 |
| a emb. 9 | 0.14 | 0.436 | 0.86 | 9 | 9 | A | A | +1.4 |
| a emb. 10 | 0.13 | 0.450 | 0.89 | 7 | 3 | A | A | +1.8 |
| a com. 1 | 0.06 | 0.387 | 0.89 | 13 | 15 | C | D | +0.9 |
| c com. 2 | 0.14 | 0.268 | 0.86 | 10 | 9 | B | B | −2.2 |
| c com. 3 | 0.13 | 0.323 | 0.86 | 8 | 10 | B | B | −0.6 |
| c com. 4 | 0.15 | 0.491 | 0.82 | 12 | 1186 | D | E | +0.6 |
| a com. 5 | 0.14 | 0.566 | 0.78 | 9 | 13 | A | B | −0.4 |
| c com. 6 | 0.35 | 0.38 | 0.83 | 11 | 21 | B | B | +0.3 |
| c com. 7 | 1.3 | 0.365 | 0.85 | 6 | 6 | A | B | 0 |
| a com. 8 | 0.13 | 0.301 | 0.88 | 10 | 8 | A | A | −0.4 |
| c com. 9 | 0.13 | 0.436 | 0.83 | 9 | 856 | D | D | +0.6 |

*a: polyurethane resin component containing aminoquinone
b: vinyl chloride resin component containing aminoquinone
c: polyurethane resin component containing no aminoquinone As seen from the example of the comparative 1 in Table 1-3, when the thickness "t" of the magnetic layer is as thin as 0.06 μm (<0.08 μm), the magnetic tape has poor durability because of serious scratch and stain (rank D) on the surface of the magnetic head, even when the resin component contains the aminoquinone structure.

The comparatives 2 and 3 show fairly good durability characteristics (rank B), but values of C/N thereof are degraded compared to those of the embodiments from 1 to 10 because the saturation magnetic flux densities Bs thereof are as small as 0.268 T and 0.323 T (<0.35 T).

The comparatives 4 and 9 show good results in the C/N characteristic because the saturation magnetic flux densities Bs thereof are adequately large, however, the durability characteristics thereof are degraded compared to those of the embodiments from 1 to 10.

The comparative 5 shows the best result (rank A) in the evaluation of scratch resulting from the introduction of the aminoquinone structure compared to that of the comparative 2 even when the thickness of the magnetic layer thereof is the same as that of the comparative 2. However, the comparative 5 is degraded in C/N compared to those of the embodiments from 1 to 10.

As seen from a fact that the squareness ratio is as small as 0.78, when the value of Bs is as large as 0.566 T (>0.55 T), (i.e., the saturation magnetization σs of the magnetic powder is large), the dispersibility of the magnetic powder is considered to be degraded.

The comparative 8 shows the best result (rank A) in both the scratch and the stain of the magnetic head resulting from the introduction of the aminoquinone structure compared to that of the comparative 3 of which the thickness of the magnetic layer is the same as that of the comparative 8. But, the value of C/N is smaller compared to those of the embodiments from 1 to 10 because the value 0.301 T (<0.35 T) of the saturation magnetic flux density Bs is too small.

The comparatives 6 and 7 show fairly good results both in the dropout and in the durability characteristics of the scratch and the stain, however, the overwriting characteristic is sacrificed because the values 0.35 and 1.3 μm (>0.25 μm) of the thickness of the magnetic layers are too large.

On the contrary, in the respective embodiments from 1 to 10, wherein the resin component for the magnetic layer contains the aminoquinone structure and the saturation magnetic flux density Bs is 0.35 T to 0.55 T, the respective items such as the signal dropout, the scratch and the stain of the magnetic head are excellent. Thus, they are excellent in both the durability and the C/N characteristic. Further, their thicknesses of the magnetic layers are as thin as 0.08 to 0.25 μm. Thus, they have also excellent over-write characteristics. Thus, according to the third embodiment of the present invention, it is possible to provide the magnetic recording medium having excellent electromagnetic conversion characteristic and durability and suitable for the high density recording medium.

A Fourth Embodiment

A fourth embodiment of the present invention relates to a coating type magnetic recording medium. One of the main features of the third embodiment is that in the recording medium formed with a magnetic layer on a substrate there is employed at least a resin component as a component of a binder for forming the magnetic layer, and the resin component contains at least an aminoquinone structure selected from the aminoquinone structure group shown with formulas (3-1a) and (3-1b) as a constitutional unit.

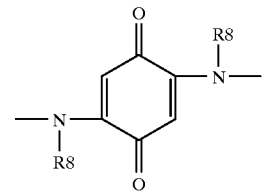

(3-1a)

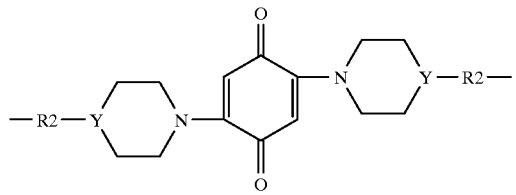

(3-1b)

wherein
R8=hydrogen, alkyl group, aralkyl group and phenyl group
R2=alkylene group, phenylene group
Y=N, CH The inventors of the present invention have studied the aminoquinone structure, and obtained following results.

The resin component employing the aminoquinone structure has the excellent dispersibility of the magnetic powder and presents the high corrosion resistance and the magnetic layer including the resin component has an excellent mechanical strength as mentioned in the foregoing. In addition, when the Young's modulus of the magnetic layer is made to be 16 to 40 GN/m$^2$, the magnetic tape has an adequate stiffness, in view of the durability of the magnetic tape. In particular, when the running durability of the magnetic tape is desired to be more excellent, it is preferable to cause the Young's modulus of the magnetic tape to be 16~25 GN/m$^2$. Above all, when the conservation durability is desired to be more excellent, it is preferable to cause the Young's modulus of the magnetic tape to be 25 to 40 GN/m$^2$.

As resin components used in the present invention, it is possible to use the well-known conventional resins such as polyester resin, polyurethane resin, vinyl chloride copolymer, acrylic acid ester-acrylonitorile copolymer, acrylic acid ester-styrene copolymer, polyvinyl butyral, cellulose derivative, phenol resin, phenoxy resin, epoxy resin, polyamide resin and silicone resin.

It is possible to introduce polar groups shown with the formula (4-2) in these resins.

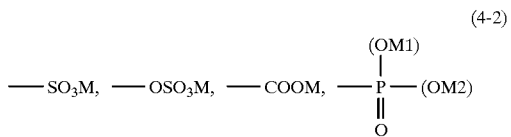

(4-2)

wherein,

M = hydrogen, alkali metals ( such as K, Na, Li)

M1 = hydrogen, alkali metals ( such as K, Na, Li) and alkyl group

M2 = hydrogen, alkali metals ( such as K, Na, Li) and alkyl group

The content ratio of the aminoquinone structure shown with the formulas (3-1a), (3-1b) contained in the resin component to all amount of the resin component is from 0.01 to 40 wt %, preferably from 0.1 to 30 wt %. It is possible to introduce polar groups into the resin component to enhance the dispersibility of the magnetic powder.

The corrosion resistance of the magnetic powder can be more improved by employing tertiary nitrogen as the "N" shown in the formulas (3-1a) and (3-1b) as mentioned in the foregoing.

The Young's modulus of the magnetic layer is controlled by well known techniques, for instance, alternating a kind of chain-growth agent, an amount of a curing agent, surface treatment of the magnetic powder, dispersant, a ratio of the magnetic powder to the binder, the ratio of an amount of the other binder to an amount of the polyurethane resin.

Next, a description is given of the concrete examples of the present invention, wherein the magnetic tapes have back coat layers. First of all, a description is given of the examples of magnetic tapes in which the Young's modulus of the magnetic layer is made within a range of 16 to 25 GN/m².

<Embodiment 1>

| | |
|---|---|
| (1) ferromagnetic powder | 100 weight parts |
| (composition: Fe 70%, Co 30%) | |
| coercive force: 160 kA/m | |
| specific surface area: 64 m²/g | |
| length of long axis: 0.08 μm | |
| (2) binder | |
| polyurethane resin containing aminoquinone | 6.5 weight parts |
| (a content rate of the aminoquinone structure shown with formula (3-1a) (wherein R1 is methyl group) is made to be 2 wt % and an amount of —SO₃H group is made to be 0.08 m mol/g) | |
| vinyl chloride resin | 6.5 weight parts |
| (MR 110 from Nippon Zeon) | |
| α-alumina | 3 weight parts |
| palmitic acid | 2 weight parts |
| myristic acid butyl | 1 weight parts |
| methyl ethyl ketone | 100 weight parts |
| cyclohexanone | 100 weight parts |

The respective magnetic paints were prepared in such a manner that after kneading treatment of the mixture of the ferromagnetic powder and the binder, the mixture was stirred and dispersed by a sand mill, and it was further stirred after adding 4 weight parts of a curing agent (coronate L from Nippon Polyurethane Co.).

As additives other than the above elements, there may be included Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B in the above ferromagnetic powder.

The respective magnetic tapes were prepared by coating the respective magnetic paints on a film base of PEN (polyethylene naphtharate) having a thickness of 5.5 μm so as to form a magnetic layer thereon. After forming a back coat layer mainly composed of carbon black on the back surface opposite to the magnetic layer and calendering process, the magnetic tape was obtained by slitting the film base into a width of 6.32 mm.

<Embodiment 2>

In the embodiment 1, the amount of the polyurethane resin and the vinyl chloride resin were respectively substituted 10 weight parts for, and the magnetic tape was obtained, other conditions remaining the same as those in the embodiment 1.

<Embodiment 3>

In the embodiment 1, the amounts of the polyurethane resin and the vinyl chloride resin were respectively substituted 8.3 weight parts for, and the magnetic tape was obtained, other conditions remaining the same as those in the embodiment 1.

<Embodiment 4>

In the embodiment 1, the amount of the curing agent was substituted 7.5 weight parts for, and the magnetic tape was obtained, other conditions remaining the same as those in the embodiment 1.

<Embodiment 5>

In the embodiment 1, the amounts of the polyurethane resin and the vinyl chloride resin were respectively substituted 6.6 weight parts and 10 weight parts for, and the magnetic tape was obtained, other conditions remaining the same as those in the embodiment 1.

<Embodiment 6>

In the embodiment 1, the aminoquinone structure thereof shown with the formula (3-1a) was substituted one shown with the formula (3-1b) for, (wherein R2 is xylyl group), and the magnetic tape was obtained, other conditions remaining the same as those in the embodiment 1.

<Embodiment 7>

In the embodiment 1, the polyurethane resin and the vinyl chloride resin (MR-110) were respectively substituted the polyurethane (UR8300 from Toyobo) having no aminoquinone and the vinyl chloride resin having the aminoquinone structure shown with the formula (3-1a), (wherein R8 is phenyl group and the amount of the aminoquinone structure was made to be 1.5 wt %), and the magnetic tape was obtained, other conditions remaining the same as those in the embodiment 1.

<Embodiment 8>

In the embodiment 1, the content rate of the aminoquinone structure in the polyurethane resin containing the aminoquinone was substituted 27 wt % for, and the magnetic tape was obtained, other conditions remaining the same as those in the embodiment 1.

<Embodiment 9>

In the embodiment 1, "R8"=methyl group of the aminoquinone structure shown with the formula (4-1a) was substituted "R8"=H (hydrogen) for, and the magnetic tape was obtained, other conditions remaining the same as those in the embodiment 1.

<Comparative 1>

In the embodiment 1, the amounts of the polyurethane resin and the vinyl chloride resin were respectively substituted 16.6 weight parts for, and the magnetic tape was obtained, other conditions remaining the same as those in the embodiment 1.

<Comparative 2>

In the embodiment 1, the vinyl chloride resin was substituted the epoxy resin for, and the amounts of the polyurethane resin and the vinyl chloride resin were respectively substituted 6.6 weight parts and 10 weight parts for, and the magnetic tape was obtained, other conditions remaining the same as those in the embodiment 1.

<Comparative 3>

In the embodiment 1, the polyurethane resin having the aminoquinone structure was substituted the polyurethane resin (UR8300 from Toyobo) having no aminoquinone structure, and the magnetic tape was obtained, other conditions remaining the same as those in the embodiment 1.

The Young's modulus of the magnetic layer of the respective magnetic tapes were calculated from measurement values of Young's modulasli of both the overall magnetic tape and the non-magnetic substrate. The measurement values thereof were obtained by a universal tension test machine (from Orientic).

On the evaluation tests of the magnetic tapes, a W-VHS (an industrial standard) deck (HR-W1 from JVC), partially modified, was used, and the MIG head having a gap length of 0.25 $\mu$m was used as the the magnetic head.

The evaluation tests of the electro-magnetic conversion characteristics were preformed by recording and reproducing a rectangular wave having a recording wave length of 0.49 $\mu$m on and from the respective magnetic tapes.

The evaluation tests of the time lapse stability (the evaluation of the conservative corrosion resistance) were performed in such a manner that after the magnetic tapes were preserved for 30 days under a condition of temperature of 60° C. and humidity of 90%, the relative reproducing output level and saturation magnetic flux density were respectively obtained by comparing the reproducing output level and saturation magnetic flux density with the initial values thereof.

The evaluation tests of still motion pictures (the evaluation of the running durability) of the magnetic tapes were conducted by measuring a time period until the output level was degraded by −6 dB compared to the initial value (0 dB) thereof. The evaluation was performed by using 4-step method as follows.

Rank "A": the magnetic tapes had no defect and a degradation of the reproducing output level of not more than −6 dB after a 60 minute running test.

Rank "B": the magnetic tapes required 30 to 60 minutes to reduce by −6 dB.

Rank "B~C": the magnetic tapes required 10 to 30 minutes to reduce by −6 dB.

Rank "C": the magnetic tapes required not more than 10 minutes to reduce by −6 dB.

The surface roughness SRa of the magnetic tape was measured by using a noncontact surface roughness meter (from ZYGO). The results of the measurement and the evaluation were shown in Table 4-1.

TABLE 4-1

| | *output level (dB) W.L. 0.49 $\mu$m | | SRa | Y.M. of Magnetic layer | Bm (G) | | 60 minit. still |
|---|---|---|---|---|---|---|---|
| | initial | after | (nm) | $GN/m^2$ | initial | after | M. P. |
| emb. 1 | +1.8 | +1.7 | 2 | 20 | 4300 | 4250 | A |
| emb. 2 | +1.3 | +1.2 | 2 | 18 | 4100 | 4080 | A |
| emb. 3 | +0.7 | +0.7 | 2 | 16 | 3700 | 3700 | A |
| emb. 4 | +1.4 | +1.5 | 2 | 21 | 4250 | 4200 | A |
| emb. 5 | +1.8 | +1.8 | 2 | 24 | 4300 | 4300 | A |
| emb. 6 | +1.6 | +1.5 | 2 | 25 | 4100 | 4080 | A |
| emb. 7 | +1.8 | +1.7 | 2 | 22 | 4200 | 4130 | A |
| emb. 8 | +1.7 | +1.7 | 2 | 23 | 4250 | 4240 | A |
| emb. 9 | +1.4 | +1.2 | 3 | 18 | 4100 | 4080 | A |
| com. 1 | +0.0 | −0.1 | 2 | 14 | 3500 | 3500 | B–C |
| com. 2 | +1.0 | +1.2 | 3 | 28 | 4200 | 4200 | B |
| com. 3 | +1.5 | −7.2 | 2 | 18 | 4200 | 1400 | A |

*reproducing output level, wherein the output level of com. 1 is made the reference level (0 dB)

As seen from Table 4-1, the comparative 3 having no aminoquinone structure has a problem in the conservation corrosion resistance because of a large degradation in the reproducing output level and the saturation magnetic flux density after the high temperature and humidity test.

The comparative 1 having the aminoquinone structure but having as small as 14 $GN/m^2$ of the Young's modulus has a problem in the still motion picture characteristic (still), though the reproducing output level and saturation magnetic flux density are not degraded so much.

The comparative 2 having the aminoquinone structure but having as large as 28 $GN/m^2$ of the Young's modulus has a problem in the still motion picture characteristic compared to those of the embodiments from 1 to 9, though there is no degradation in the reproducing output level and the saturation magnetic flux density after the high temperature and humidity test.

On the other hand, the respective embodiments from 1 to 9 containing at least one aminoquinone structure shown with the formulas (3-1a) or (3-1b) show the adequate reproducing output level and saturation magnetic flux density in the initial state and the lower degradation of the reproducing output level and saturation magnetic flux density after the high temperature and humidity test. These embodiments from 1 to 9 having excellent dispersibility of the magnetic powder suggest that they have also the excellent corrosion resistance because the excellent dispersibility of the magnetic powder causes the binder containing aminoquinone structure to present its inherently excellent corrosion resistance to the magnetic powder.

Further, in the respective embodiments from 1 to 9, the still motion picture characteristics are excellent by causing the Young's modulus of the magnetic layer to be within a range of 16 to 25 $GN/m^2$.

Thus, they have excellent running durability resulting from its high stiffness of the magnetic tape. In addition, they have a small surface roughness.

Next, a description is given of the embodiments from 11 to 19, wherein the Young's modulus of the respective magnetic layers is made to be a range of 25 to 40 $GN/m^2$, taking account of the preservation durability.

<Embodiment 11>

In the embodiment 1, the polyurethane resin and the vinyl chloride resin were respectively substituted the polyurethane having the aminoquinone structure (wherein R1 is a phenyl group and the content rate of the aminoquinone structure is made to be 2.0 wt % and —$SO_3$H is contained by 0.08 m mol/g) and the phenoxy resin (containing —SO3 H group by 0.05 m mol/g) for, and the magnetic tape was obtained, other conditions remaining the same as those in the embodiment 1.

<Embodiment 12>

In the embodiment 11, the amounts of the polyurethane resin and the phenoxy resin were respectively substituted 10 weight parts for, and the magnetic tape was obtained, other conditions remaining the same as those in the embodiment 11.

<Embodiment 13>

In the embodiment 11, the amounts of the polyurethane resin and the phenoxy resin were respectively substituted 8.3 weight parts for, and the magnetic tape was obtained, other conditions remaining the same as those in the embodiment 11.

<Embodiment 14>

In the embodiment 11, the amount of the curing agent was made to be 7.5 weight parts, and the magnetic tape was obtained, other conditions remaining the same as those in the embodiment 11.

<Embodiment 15>

In the embodiment 11, the amounts of the polyurethane resin and the phenoxy resin were respectively substituted 6.6 weight parts and 10 weight parts for, and the magnetic tape was obtained, other conditions remaining the same as those in the embodiment 11.

<Embodiment 16>

In the embodiment 11, the aminoquinone structure contained in the polyurethane resin was substituted the aminoquinone structure shown with the formula (3-1a), (wherein R2 is xylyl group), and the magnetic tape was obtained, other conditions remaining the same as those in the embodiment 11.

<Embodiment 17>

In the embodiment 11, the phenoxy resin was substituted the vinyl chloride resin containing the aminoquinone structure shown with the formula (3-1a), wherein R1 is xylene group, and the content rate of the aminoquinone was made to be 1.5 wt %, and the magnetic tape was obtained, other conditions remaining the same as those in the embodiment 11.

<Embodiment 18>

In the embodiment 11, the content rate of the aminoquinone structure contained in polyurethane resin was substituted 27 wt % for, and the magnetic tape was obtained, other conditions remaining the same as those in the embodiment 11.

<Embodiment 19>

In the embodiment 11, the aminoquinone structure contained in polyurethane resin was substituted the aminoquinone shown with the formula (3-1a) (wherein R8 is made to be hydrogen) for, and the magnetic tape was obtained, other conditions remaining the same as those in the embodiment 11.

<Comparative 4>

In the embodiment 11, the phenoxy resin was substituted the vinyl chloride resin for, and the amounts of the polyurethane resin and the vinyl chloride resin were respectively made to be 10 weight parts and 6.6 weight parts, and the amount of the curing agent was made to be 4 weight parts, and the magnetic tape was obtained, other conditions remaining the same as those in the embodiment 11.

<Comparative 5>

In the embodiment 11, the amounts of the polyurethane resin and the phenoxy resin and the curing agent were respectively made to be 6.6 weight parts and 10 weight parts and 10 weight parts, and the magnetic tape was obtained, other conditions remaining the same as those in the embodiment 11.

<Comparative 6>

In the embodiment 11, the polyurethane resin containing the aminoquinone structure was substituted the polyurethane resin (UR-8300 from Toyobo) having no aminoquinone, and the magnetic tape was obtained, other conditions remaining the same as those in the embodiment 11.

The control of the Young's modulus of the magnetic layer is not limited to the above methods (control of the composition of the resin component and the amount of the curing agent). As mentioned in the foregoing, the Young's modulus of the magnetic layer is controlled by well known techniques, for instance, alternating a kind of chain-growth agent, an amount of a curing agent, surface treatment of the magnetic powder, dispersant, a ratio of the magnetic powder to the binder, the ratio of an amount of the other binder to an amount of the polyurethane resin, and the control of a compression rate by the calender treatment.

Regarding the embodiments and the comparatives, there were performed the evaluation of the electro-magnetic conversion characteristic, the evaluation of the time lapse stability, the measurement of the surface roughness SRa, the measurement of the Young's modulus of the magnetic layer, and the measurement of the saturation magnetic flux density of the magnetic layer.

Further, as the evaluation of the time lapse stability, the number of the signal dropouts was measured in an initial state and in a state after a high temperature and humidity test (the evaluation of the conservative durability), wherein the number of dropouts was defined as follows.

An reproducing output level degradation of −20 dB continuing for 5 μsec was counted as one signal dropout in reproducing.

The number of the signal dropouts was defined as the number of the signal dropouts during a minute running of the magnetic tape.

The results of the measurements and the evaluation are shown in Table 4-2.

TABLE 4-2

| | *output level (dB) W.L. 0.49 μm | | SRa | Y. M. of Magnetic layer | Bm (G) | | D/O (N./mini.) | |
|---|---|---|---|---|---|---|---|---|
| | init. | after | (nm) | GN/m$^2$ | init. | after | init. | after |
| emb. 11 | +1.3 | +1.2 | 2 | 30 | 4300 | 4250 | 25 | 30 |
| emb. 12 | +0.8 | +0.7 | 2 | 26 | 4200 | 4180 | 20 | 18 |
| emb. 13 | +0.7 | +0.7 | 2 | 28 | 4300 | 4300 | 18 | 24 |
| emb. 14 | +1.0 | +1.0 | 2 | 36 | 4250 | 4200 | 20 | 25 |
| emb. 15 | +1.1 | +1.1 | 2 | 38 | 4300 | 4300 | 28 | 20 |
| emb. 16 | +0.9 | +0.9 | 2 | 31 | 4400 | 4400 | 20 | 19 |
| emb. 17 | +0.7 | +0.8 | 2 | 26 | 4200 | 4160 | 24 | 23 |
| emb. 18 | +1.0 | +1.1 | 2 | 34 | 4380 | 4380 | 26 | 24 |
| emb. 19 | +0.5 | +0.3 | 2 | 26 | 4200 | 4120 | 27 | 30 |
| com. 4 | +0.0 | −0.1 | 2 | 20 | 4000 | 4000 | 20 | 40 |
| com. 5 | −4.0 | −4.2 | 8 | 48 | 4200 | 4200 | 130 | 128 |
| com. 6 | +0.3 | −7.2 | 2 | 29 | 4100 | 2100 | 26 | 260 |

*reproducing output level, wherein the output level of com. 4 is made the reference level (0 dB)

As seen from Table 4-2, the comparative 6 containing no aminoquinone structure has a problem in the conservation durability because the reproducing output level and saturation magnetic flux density are degraded after the high temperature and humidity conservation test.

The comparative 4 containing the aminoquinone structure but having the small Young's modulus of the magnetic layer as 20 GN/m² shows a larger increase in the number of signal dropouts (referred to as D/O compared to those of the embodiments from 11 to 19, though there is seldom seen the reduction of the reproducing output level and the saturation magnetic flux density after the high temperature and humidity.

The comparative 5 containing the aminoquinone structure but having the larger Young's modulus of the magnetic layer as 48 GN/m² has a larger value of the surface roughness of the magnetic layer and shows a lower value of the reproducing output level itself and the larger number of D/O.

On the other hand, the embodiments from 11 to 19 having at least one aminoquinone structure selected from the aminoquinone structures shown with the formulas (4-1a) and (4-1b) show adequate values in both the reproducing output level and the saturation magnetic flux density in the initial state, and show a little degradation thereof after the high temperature and humidity test. This suggests that the the magnetic powder was adequately dispersed in the magnetic layer, thus the magnetic layer has excellent corrosion resistance of the magnetic layer. In other words, in order to present the inherently excellent corrosion resistance of the binder containing aminoquinone structure, the binder is required to have the excellent dispersibility of the magnetic powder in the binder.

Further, the embodiments from 11 to 19 maintain the excellent number of D/O after the high temperature and humidity test. This reason is considered that the Young's modulasli of them were made to be a range of 25 to 40 GN/m².

Thus, it will be understood that the respective embodiments from 11 to 19 have the adequate mechanical strength of the magnetic layer and are excellent in the conservation durability. Further, they have realized the magnetic recording mediums having an excellent surface roughness.

[A Fifth Embodiment]

A fifth embodiment of the present invention relates to a coating type magnetic recording medium.

The inventors have studied how to realize a magnetic recording medium having an excellent corrosion resistance without sacrificing inherently excellent magnetic properties of a metal ferromagnetic powder.

As a result, the inventors have found a fact that it is possible to obtain a magnetic recording medium having an excellent corrosion resistance without sacrificing the inherently excellent magnetic properties of the metal ferromagnetic powder by forming a membrane of aluminum compound on a surface of respective iron particles or iron alloy particles of ferromagnetic powder, and by employing a binder for forming the magnetic layer, including at least a resin component containing at least an aminoquinone structure selected from the aminoquinone structure group shown with formulas (5-1a) and (5-1b) as a constitutional unit.

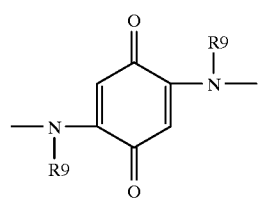

(5-1a)

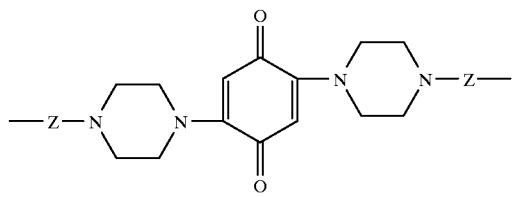

(5-1b)

wherein
R9=hydrogen, branching C1–C6 alkyl group, linear C1–C6 alkyl group, and cyclic C1–C6 alkyl group, aralkyl group and phenyl group
Z=branching C1–C6 alkyl chain, and linear C1–C6 alkyl chain, Specifically, the inventors have studied the structure of the aminoquinone group, and a combination of the binder containing the aminoquinone group and the surface coating membrane for the particles of the magnetic powder.

In a conventional method of forming the membranes on the surfaces of the particles of the metal ferromagnetic powder to enhance the corrosion resistance, a well known silicon compound such as $SiO_2$ or $Si(OH)_2$ has been used as the membrane material.

On the process of studying, however, the inventors have found a fact that the corrosion resistance of the metal ferromagnetic particles employing the silicon compound as the membrane is scarcely improved even when the binder containing the aminoquinone group is used in the magnetic layer. As a result, the inventors have found a fact that the corrosion resistance of the particles is largely improved only when alumina (aluminum oxide such as $Al_2O_3$) or an aluminum compound such as $Al(OH)_3$ is contained in the membrane material for the metal ferromagnetic powder. This is considered that the existence of the aluminum compound enhances the bonding strength between the binder containing the aminoquinone group and the metal ferromagnetic powder, resulting in giving a high corrosion resistance to the metal ferromagnetic powder.

In the metal ferromagnetic powder of which particles are formed with the membranes on the surface thereof, when a content rate (weight %) of all the "Al" as atom in all the metal ferromagnetic powder containing the "Al" is lager than 0.7 wt %, the corrosion resistance is adequately improved as mentioned hereinafter. Thus, it should be noted that a small amount of membrane material can enhances the corrosion resistance adequately, thus resulting in obtaining a magnetic recording medium without sacrificing the inherently excellent magnetic properties of the metal ferromagnetic powder.

Accordingly, it is possible to provide an excellent magnetic recording medium suitable to the high density magnetic recording and capable of being conserved for a long time.

Further, the maximum content rate of the "Al" as atom in the constitution elements is preferably within 20 wt %.

Incidentally, even when a membrane material of a silicon compound other than the membrane material of the aluminum compound is employed for the metal ferromagnetic powder, it does not have adverse effect on the corrosion resistance as long as the content rate of the membrane material of the silicon compound in the metal ferromagnetic powder is not more than 1.5 wt %.

As the resin component used in the binder of the present invention, there are thermoplastic resin and thermosetting resin.

As the thermoplastic resin, there are vinyl chloride resin, urethane elastomer, polyvinyl butyral, nitrocellulose derivative and polyester resin.

As the thermosetting resin, there are phenol resin, epoxy resin, urea resin, silicon resin and a mixed material of polyurethane and polyisocyanate.

[Embodiments from 1 to 12]

Polyurethane as a resin component was synthesized by reacting various kinds of diols and isocyanates, using an aminoquinone monomer "AQ-01" having the aminoquinone group shown with the formula (5-1a), wherein "R9" is a methyl group, and an aminoquinone monomer "AQ-02" shown with the formula (5-1b), wherein "Z" is a hydroxyl group, as the aminoquinone group.

A representative example of this polyurethane is one which employs polycaprolactone diol ( the molecular weight is 1250) as the diol and TDI (trilene-2,4-diisocyanate) as the isocyanate and a monomer shown with the formula (AQ-01) containing an amount of 20 wt %.

As another diol, terathane, polycarbonate, polycaprolactone, polybuthylene adipate or polybutane is used. As another isocyanate, MDI (methylene di-p-phenyl diisocyanate is used.

The monomers AQ-01, AQ-02 are respectively shown as follows.

Further, the metal ferromagnetic powders (metal magnetic powder) used in the magnetic paints were analyzed by using an X-ray microanalyzer. These results are shown in Table 5-2

TABLE 5-2

| magnetic powder No. | PIG-01 (wt %) | PIG-02 (wt %) | PIG-03 (wt %) | PIG-04 (wt %) | PIG-05 (wt %) |
|---|---|---|---|---|---|
| Fe | 67.0 | 55.0 | 45.0 | 57.0 | 82.0 |
| Co | 0 | 9.2 | 15.0 | 10.5 | 8.3 |
| Ni | 0 | 2.1 | 0 | 2.5 | 2.5 |
| O | 30.0 | 30.5 | 27.0 | 28.0 | 3.5 |
| Nd | 0 | 0 | 10.0 | 0 | 0 |
| Al | 2.1 | 0 | 1.1 | 2.7 | 0.7 |
| Si | 0.1 | 2.5 | 1.5 | 0 | 2.5 |
| others | 0.2 | 0.7 | 0.4 | 0.3 | 0.5 |

As seen from Table 5-2, PIG-01, PIG-03 and PIG-05 respectively designate a metal ferromagnetic powder (magnetic powder) formed with membranes made of both aluminum compounds and silicon compounds. PIG-02 designates a metal ferromagnetic powder formed with membranes made of only the silicon compounds, and PIG-04 formed with membranes made of only aluminum compounds.

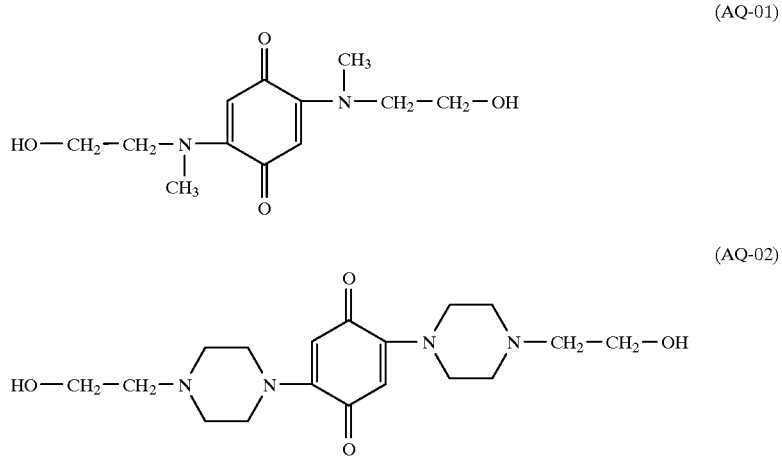

(AQ-01)

(AQ-02)

The polyurethanes synthesized in this fifth embodiment are shown in Table 1, wherein AQU-01 to AQU-05 designate respective polyurethanes used in this embodiment.

Further, the molecular weight of the polydiol used was 500–5,000, and the molecular weight of the polyurethane obtained was 10,000 to 50,000.

TABLE 5-1

| polyurethane | AQ monomer | polydiol | diisocyanate | ratio of AQ (%) |
|---|---|---|---|---|
| AQU-01 | AQ-01 | butane | TDI | 20 |
| AQU-02 | AQ-01 | butane | MDI | 20 |
| AQU-03 | AQ-01 | caprolactone | TDI | 25 |
| AQU-04 | AQ-01 | *butyl. ad. | TDI | 30 |
| AQU-05 | AQ-02 | butane | TDI | 20 |

*bytylene adipate

As comparatives, the polyurethane and the polyvinyl chloride containing no aminoquinone monomer are respectively shown with REF-01, REF-02 as shown in Table 5-3.

The content amount of Al or Si used for the membrane was controlled by a surface treatment amount on the process of producing the metal ferromagnetic powder.

Specifically, the content amount was controlled by a solution density containing Al ion or Si ion upon a surface treatment process of the goethite using the solution. After that, a desired metal ferromagnetic powder was obtained through drying, pulverizing and reducing process.

Each of magnetic paints was obtained by dispersing the metal ferromagnetic powder shown in Table 5-2 and polyurethane and PVC (polyvinyl chloride) as the resin component into an equivalent amount mixing solvent made of methyl ethyl ketone, toluene and cyclohexanone.

The paint composition of embodiments from 1 to 12 and comparatives from 1 to 6 was as follows:

magnetic powder: 100 weight parts
polyurethane: 15 weight parts
PVC (polyvinyl chloride): 15 weight parts
additives: 2 weight parts
mixing solvent: 380 weight parts Incidentally, the dispersion was performed by using a table type sand mill.

The metal ferromagnetic powders used were made of acicular particles having an average long axial length of about 100 nm and a ratio of the average long axial length to an average width axial length of about 8. As the additives, an abrasive agent and a lubricant were added. The respective magnetic paints were coated on a PET (polyethylene telephtharate film) and cut into a square piece of 6 mm×6 mm.

These square pieces were dipped into a commercial buffer liquid, and changing amounts of the saturation magnetization thereof were obtained by measuring the amounts of saturation magnetization thereof after having been dipped for 2 hours and after for 12 hours.

These changing amounts were respectively represented as a percentage (%) of a net changing amount to an initial value of the saturation of magnetization.

Table 5-3 shows the results of evaluation and the composition contents.

TABLE 5-3

| | magnetic powder | resin compon. | chang. anmunt of S.M. | |
|---|---|---|---|---|
| | | | after 2 hours | after 12 hours |
| emb. 1 | PIG-01 | AQU-01 | 0.35 | 0.40 |
| emb. 2 | PIG-01 | AQU-02 | 0.31 | 0.42 |
| emb. 3 | PIG-01 | AQU-03 | 0.10 | 0.10 |
| emb. 4 | PIG-01 | AQU-04 | 0.15 | 0.22 |
| emb. 5 | PIG-01 | AQU-05 | 0.25 | 0.31 |
| emb. 6 | PIG-03 | AQU-01 | 1.1 | 1.5 |
| emb. 7 | PIG-03 | AQU-05 | 0.12 | 1.0 |
| emb. 8 | PIG-04 | AQU-01 | 0.36 | 0.38 |
| emb. 9 | PIG-04 | AQU-02 | 0.23 | 0.38 |
| emb. 10 | PIG-04 | AQU-03 | 0.05 | 0.08 |
| emb. 11 | PIG-04 | AQU-04 | 0.11 | 0.13 |
| emb. 12 | PIG-04 | AQU-05 | 0.22 | 0.34 |
| com. 1 | PIG-02 | AQU-01 | 48.0 | 100.0 |
| com. 2 | PIG-02 | AQU-02 | 75.5 | 100.0 |
| com. 3 | PIG-02 | AQU-03 | 55.2 | 100.0 |
| com. 4 | PIG-02 | AQU-05 | 98.0 | 100.0 |
| com. 5 | PIG-05 | AQU-01 | 100.0 | 100.0 |
| com. 6 | PIG-05 | AQU-05 | 100.0 | 100.0 |
| com. 7 | PIG-01 | RFE-01 | 98.8 | 100.0 |
| com. 8 | PIG-01 | RFE-02 | 97.9 | 100.0 |

In the respective embodiments from 1 to 12 and comparatives from 1 to 6, the resin component used was constructed so that the amount of the polyurethane containing the aminoquinone group was the same as that of the PVC (polyvinyl chloride) having no aminoquinone group, i.e., each 50%.

In the comparatives 7 and 8, the resin components thereof were respectively constructed by REF-01 and REF-02. The composition of the magnetic paints used in the comparatives 7 and 8 were the same as that of the embodiments 1 to 12 and the comparatives 1 to 6 except for the resin components.

As the additives other than the abrasive agent and lubricant, an electrification proof agent and a dispersant may be added in the magnetic paints.

As the abrasive, there are alumina, titanium oxide, chrome oxide and silicon oxide. As the lubricant, there are fatty acid ester and silicon oil. As the electrification proof agent, there are carbon black and nonionic and cationic surface-active agents. As the dispersant, there are fatty acid, metal salt of fatty acid, amide of fatty acid, phosphoric acid ester, sulfuric acid ester and higher alcohol.

Next, a description is given of an adsorption characteristic between the respective aminoquinone resin components and the respective magnetic powders (metal ferromagnetic powders).

In order to measure the adsorption characteristic of the magnetic powder, the respective resin components was dissolved in THF (tetrahydrofuran) solvent so as to were a predetermined density, and after that, the magnetic powder was added therein. The adsorption characteristic of the magnetic powder was obtained by measuring saturation adsorption amount of the resin component corresponding to a predetermined density of the resin component.

The results are shown in Table 5-4, wherein each of the amounts of the adsorption designates a weight (mg) per a specific surface area ($m^2$). Thus, it is possible to evaluate the adsorption characteristic between the magnetic powder and the resin component, avoiding an influence of the surface area of the magnetic powder.

TABLE 5-4

| | magnetic powder | resin compon. | satu. abs. amount (mg/$m^2$) |
|---|---|---|---|
| emb. 1 | PIG-01 | AQU-01 | 0.8 |
| emb. 2 | PIG-01 | AQU-02 | 0.76 |
| emb. 3 | PIG-01 | AQU-03 | 0.81 |
| emb. 4 | PIG-01 | AQU-04 | 0.91 |
| emb. 5 | PIG-01 | AQU-05 | 0.71 |
| emb. 6 | PIG-03 | AQU-01 | 0.71 |
| emb. 7 | PIG-03 | AQU-05 | 0.62 |
| emb. 8 | PIG-04 | AQU-01 | 0.95 |
| emb. 9 | PIG-04 | AQU-02 | 0.88 |
| emb. 10 | PIG-04 | AQU-03 | 0.79 |
| emb. 11 | PIG-04 | AQU-04 | 0.93 |
| emb. 12 | PIG-04 | AQU-05 | 0.76 |
| com. 1 | PIG-02 | AQU-01 | 0.48 |
| com. 2 | PIG-02 | AQU-02 | 0.41 |
| com. 3 | PIG-02 | AQU-03 | 0.53 |
| com. 4 | PIG-02 | AQU-05 | 0.45 |
| com. 5 | PIG-05 | AQU-01 | 0.48 |
| com. 6 | PIG-05 | AQU-05 | 0.43 |

As seen from Table 5-3, even when the membranes of the aluminum compound are formed on the surfaces of particles of the magnetic powder, the comparatives 7, 8 containing no aminoquinone group in the resin components show larger changing amounts of the saturation magnetization. Thus, they suggest that they have lower corrosion resistance, compared with the embodiments from 1 to 12.

Further, even when the resin components of the contain the aminoquinone groups, both the comparatives from 1 to 4 in which the membranes of the magnetic powders are made of only silicon compounds, and the comparatives 5, 6 in which the membranes include a large part of silicon compounds, are degraded in the corrosion resistance because of their larger changing amounts of the saturation magnetization.

On the contrary, the embodiments from 1 to 12 in which the membranes made of the aluminum compounds (alumina, Al (OH)$_3$) are adequately formed on the surfaces of the particles of the magnetic powder, and the resin components thereof contain the aminoquinone groups, show no significant changing amount of the saturation magnetization. Thus they present a high corrosion resistance.

As a result, it is considered that the resin component containing the aminoquinone group has tight bonding with the aluminum compound formed on the surfaces of the magnetic particles of the magnetic powder, and this realizes the excellent corrosion resistance. In the case of employing the silicon compound for the magnetic powder, an adsorption amount of the resin component is much less, so that the resin component containing the aminoquinone group does not adequately cover itself on the surfaces of the magnetic particles of the magnetic powder. Thus, it is impossible for the resin component containing the aminoquinone group to present its excellent corrosion resistance to the magnetic powder.

As mentioned in the foregoing, the aluminum compound is selectively absorbed to the resin component containing the aminoquinone group, so that the resin component prevents corrosion ions from invading the magnetic particles formed with the membranes of the aluminum compound. Thus, it should be noted that when the content ratio of the silicon is much larger than that of the aluminum compound in a construction of the magnetic powder, the bonding force between the resin component and the magnetic particles are degraded. This allows the corrosion ions to invade the magnetic powder, resulting in degrading the corrosion resistance of the magnetic powder.

Accordingly, upon the construction of the membrane in the magnetic powder, when the content ratio of the silicon compound becomes larger than a predetermined amount, the corrosion resistance of the magnetic powder is abruptly degraded.

According to the experimental results, a content ratio of all silicons to the magnetic powder containing all the silicons, in atom construction, is preferably not more than 1.5 weight %, wherein it is possible for the resin component containing the aminoquinone compound to maintain its excellent corrosion resistance without degrading the adsorption of the particles of the magnetic powder.

On the other hand, in the case of employing the membranes made of the aluminum compound, a lager content ratio of the aluminum compound is preferable in the view of the corrosion resistance. However, it should be noted that too large content ratio of the aluminium compound may cause the degradation of the magnetization of the magnetic powder.

In the present invention, it is possible to obtain the excellent corrosion resistance in spite of a small amount of the membrane material of the aluminum to be added in the magnetic powder.

As a result, a content ratio of all aluminum to the magnetic powder containing all the aluminum, in atom construction, is preferably from 0.7 to 20 wt %.

According to the present invention, it is possible to realize the magnetic recording medium having the high corrosion resistance without sacrificing the inherently excellent magnetic property of the metal ferromagnetic powder.

Thus, it is possible to provide the magnetic recording medium having excellent conservation characteristic for long time and capable of high density recording.

What is claimed is:

1. A magnetic recording medium comprising: a substrate; and a magnetic layer formed on the substrate, the magnetic layer comprising metal ferromagnetic powder and binding means for binding the metal ferromagnetic powder on the substrate, the binding means including at least a resin component containing at least an aminoquinone structure selected from an aminoquinone structure group shown with formulas (2-1a) and (2-1b) as a constitutional unit in a composition of the resin component and particles of the ferromagnetic powder having an average long axis length from 0.03 to 0.10 μm,

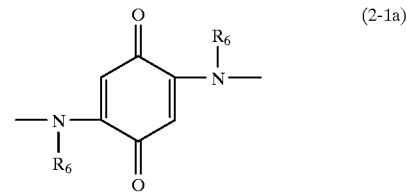

(2-1a)

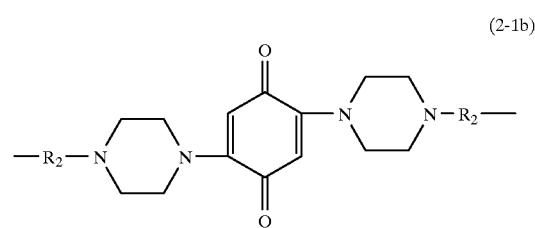

(2-1b)

wherein
R$_2$ is alkylene or phenylene, and
R$_6$ is alkyl, aralkyl or phenyl,
wherein the binding means further comprises polyurethane resin or vinyl chloride resin.

2. A magnetic recording medium comprising:
a substrate; and
a magnetic layer formed on the substrate, the magnetic layer comprising metal ferromagnetic powder and binding means for binding the metal ferromagnetic powder on the substrate, the binding means including at least a resin component containing at least an aminoquinone structure selected from an aminoquinone structure group shown with formulas (3-1a) and (3-1b) as a constitutional unit in a composition of the resin component and a saturation magnetic flux density of the magnetic layer is made to be from 0.35 to 0.55 T and a thickness of the magnetic layer is made to be from 0.08 to 0.25 μm,

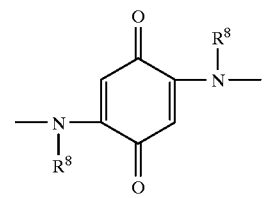

(3-1a)

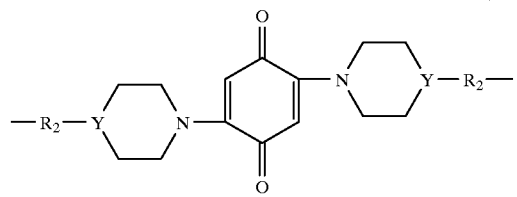

(3-1b)

wherein
R$_2$ is alkylene or phenylene
R$_8$ is hydrogen, alkyl, aralkyl or phenyl, and
Y is N or CH, and
wherein the resin component is at least one selected from the group consisting of polyurethane resin and vinyl chloride resin.

* * * * *